US011451590B2

(12) United States Patent
Hu et al.

(10) Patent No.: US 11,451,590 B2
(45) Date of Patent: Sep. 20, 2022

(54) SYSTEMS AND METHODS FOR DETERMINING ACCESS OUTCOMES USING ACCESS REQUEST SCORING

(71) Applicant: Visa International Service Association, San Francisco, CA (US)

(72) Inventors: Hung-Tzaw Hu, Saratoga, CA (US); Haochuan Zhou, Redwood City, CA (US); Ge Wen, Fremont, CA (US); Benjamin Scott Boding, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 93 days.

(21) Appl. No.: 17/083,086

(22) Filed: Oct. 28, 2020

(65) Prior Publication Data

US 2021/0044624 A1 Feb. 11, 2021

Related U.S. Application Data

(63) Continuation of application No. 16/160,943, filed on Oct. 15, 2018, now Pat. No. 10,855,726.

(51) Int. Cl.
*H04L 29/06* (2006.01)
*H04L 29/08* (2006.01)
(Continued)

(52) U.S. Cl.
CPC .......... *H04L 63/20* (2013.01); *G06F 16/2462* (2019.01); *G06F 16/9017* (2019.01);
(Continued)

(58) Field of Classification Search
CPC ............... G06F 16/24578; G06F 17/18; G06F 16/2462; G06F 16/9017; H04L 67/32;
(Continued)

(56) References Cited

U.S. PATENT DOCUMENTS 9,135,439 B2 * 9/2015 Montoro ................. H04L 67/02
9,390,243 B2 * 7/2016 Dhillon ................... G06Q 50/01
(Continued)

OTHER PUBLICATIONS

U.S. Appl. No. 16/160,936, Notice of Allowance, dated Jul. 23, 2020, 11 pages.
(Continued)

*Primary Examiner* — Mohammad A Siddiqi
(74) *Attorney, Agent, or Firm* — Kilpatrick Townsend & Stockton LLP

(57) ABSTRACT

Resources can be secured by a resource security system. The resource security system can determine whether to grant or deny access to resources using authorization information in an access request. The resource security system can also determine whether the access request is legitimate or fraudulent using risk scoring models. A score transformation table can be used to provide consistency in the risk level for a particular score over time. The score transformation table can be based on a target score profile and a precision format (e.g., integer or floating point). The score transformation table can dynamically adapt based on the trending top percent of risk and can account for changes in the distribution of scores over time or by weekday. The scores can be used to determine an access request outcome. Access to the resource can be accepted or rejected based on the outcome.

20 Claims, 11 Drawing Sheets

(51) Int. Cl.
 *G06F 16/901* (2019.01)
 *G06F 17/18* (2006.01)
 *G06F 16/2457* (2019.01)
 *G06F 16/2458* (2019.01)
 *H04L 9/40* (2022.01)
 *H04L 67/60* (2022.01)

(52) U.S. Cl.
 CPC .............. *G06F 17/18* (2013.01); *H04L 63/10* (2013.01); *H04L 63/102* (2013.01); *H04L 63/105* (2013.01); *H04L 63/1466* (2013.01); *H04L 67/60* (2022.05); *G06F 16/24578* (2019.01)

(58) Field of Classification Search
 CPC ..... H04L 67/30; H04L 63/105; H04L 63/102; H04L 63/20; H04L 63/10; H04L 63/1466
 See application file for complete search history.

(56) References Cited

U.S. PATENT DOCUMENTS

| | | |
|---|---|---|
| 10,147,065 B1 | 12/2018 | Yiftachel et al. |
| 11,042,880 B1* | 6/2021 | Hazan ................ G06Q 20/4016 |
| 2015/0295939 A1* | 10/2015 | Rissanen ................ H04L 63/10 |
| | | 726/1 |
| 2017/0300824 A1 | 10/2017 | Peng et al. |
| 2017/0301028 A1* | 10/2017 | Strabel ............. G06F 16/24578 |
| 2018/0357726 A1* | 12/2018 | Besman ................ G06Q 40/08 |
| 2019/0318420 A1* | 10/2019 | Summerson ......... G06Q 40/025 |
| 2019/0378216 A1* | 12/2019 | Fiete ..................... G06Q 40/08 |

OTHER PUBLICATIONS

U.S. Appl. No. 16/160,943, Notice of Allowance, dated Jul. 23, 2020, 11 pages.

* cited by examiner

SYSTEMS AND METHODS FOR DETERMINING ACCESS OUTCOMES USING ACCESS REQUEST SCORING

CROSS-REFERENCE TO RELATED APPLICATIONS

This application is a continuation application to U.S. application Ser. No. 16/160,943 filed Oct. 15, 2018, entitled "SYSTEMS AND METHODS FOR DETERMINING ACCESS OUTCOMES USING ACCESS REQUEST SCORING" which is related to U.S. application Ser. No. 16/160,936, entitled "SYSTEMS AND METHODS FOR DETERMINING ACCESS REQUEST SCORING FOR ACCESS OUTCOMES," filed on Oct. 15, 2018, the entire contents of which are hereby incorporated by reference for all purposes.

BACKGROUND

Unauthorized users may fraudulently obtain access to a digital or physical resource using stolen account names and authentication information. To prevent unauthorized access, a resource provider may use a risk scoring model to identify access requests having risk scores indicative of fraud. Based on the risk score, a request to access a resource may be rejected even if proper account and authentication information is provided.

However, unauthorized users may change their methods and behavior for making fraudulent resource access requests over time. Such changes in method and behavior may impact the features and parameters of the access request that are relevant to the scoring model. In addition, authorized users may also change their methods and behaviors for making legitimate resource access requests. While the scoring model can be periodically updated, the changing patterns of behavior can cause inconsistency in scoring over time. Accordingly, there is a need for improved systems and methods for securing access to resources.

BRIEF SUMMARY

Some embodiments provide a method for processing access requests. The method can be performed by a computer system. The method includes determining raw scores for a plurality of previous access requests using a scoring model. Each of the raw scores can be within a set of potential output values of the scoring model. For example, the set of potential output values (e.g., potential scores) for the scoring model can be integers from 0 to 100,000. That is, the values can be stored as integers. The method can further include determining, for each potential output value of the set of potential output values, a percentage of the raw scores that equal the potential output value. The method can further include determining a trending top percent table including a trending top percent value for each potential output value. The trending top percent value for a particular potential output value can be based on the percentages of the raw scores that are equal to or greater than the potential output value. For example, a score of 90,000 can be in the top 10% of the raw scores for the plurality of previous access requests.

The method can further include determining a first distribution function using a first predetermined top percent value for a first abbreviated score. The first distribution function can map each abbreviated score in a set of abbreviated scores to a target population percentage for the abbreviated score where the set of abbreviated scores includes the first abbreviated score. The method can further include determining a scoring profile table including a target top percent value for each abbreviated score in the set of abbreviated scores based on the first distribution function. For example, the set of abbreviated scores can be integers from 0 to 99.

The method can further include determining a score transformation table by determining, for each abbreviated score in the set of abbreviated scores, a corresponding potential output value. The corresponding potential output value can be determined based on its trending top percent value being closer to the target top percent value for the abbreviated score compared to the trending top percent values for other potential output values. The score transformation table can be used to determine a first abbreviated score based on a first raw score for a first access request that is determined using the scoring model. The first abbreviated score can indicate an access request outcome for the first access request. The outcome can be based on a threshold. For example, an abbreviated score of 10 can indicate that the access request should be accepted while an abbreviated score of 90 can indicate that the access request should be denied.

These and other embodiments of the disclosure are described in detail below. For example, other embodiments are directed to systems, devices, and computer readable media associated with methods described herein.

Further details can be found in the detailed description and the figures.

DETAILED DESCRIPTION

Figure 1:
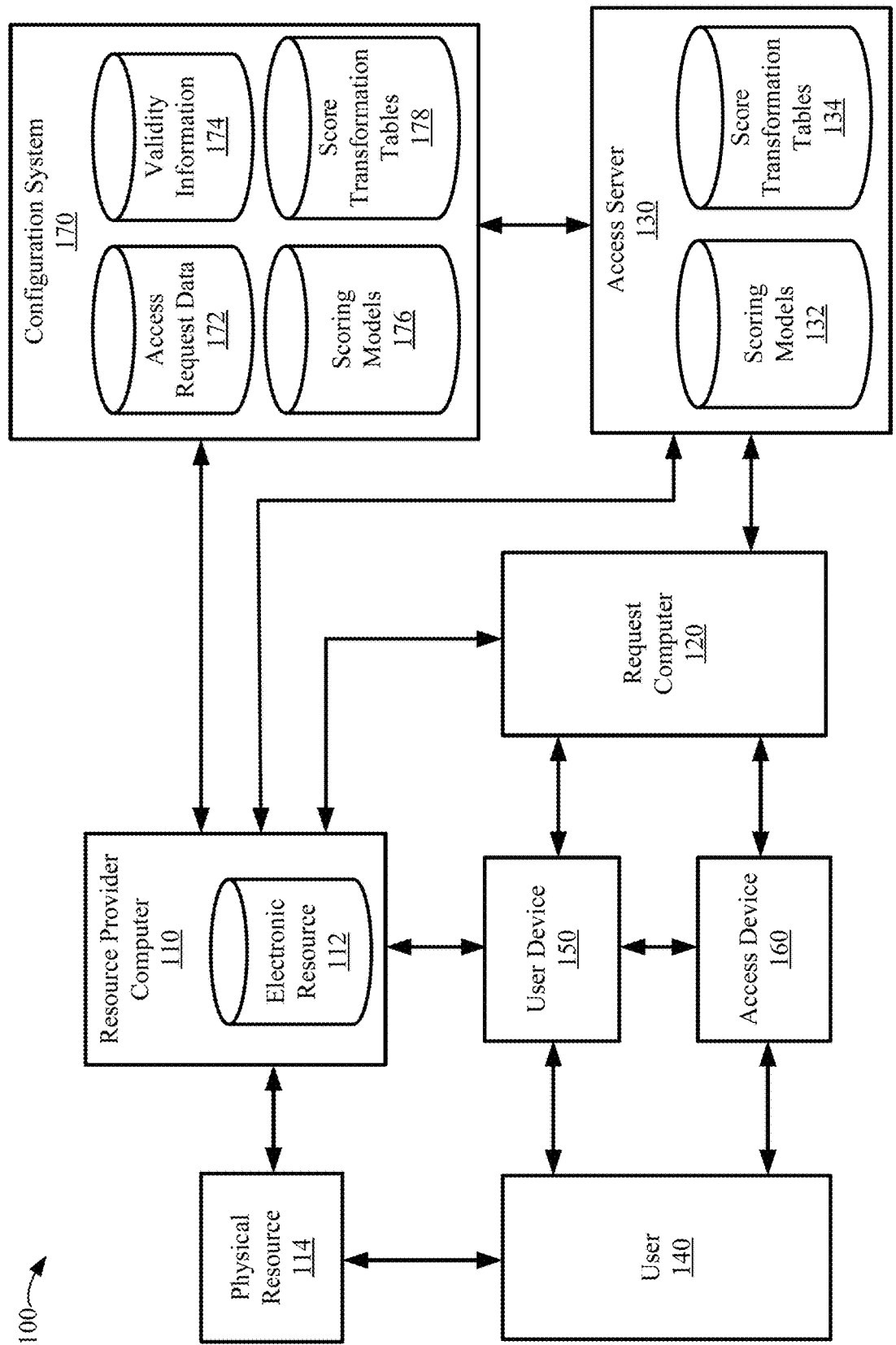
FIG. 1 shows a resource security system for providing access to resources, in accordance with some embodiments.

A resource security system may be used to grant or deny access to resources. The resource security system can include an access server implementing a scoring model that provides risk scores. The risk scores can be used by a resource provider computer or a request computer to reject access requests having risk scores indicative of fraud. In some embodiments, higher scores can indicate a higher risk level (e.g., the access request is more likely to be fraudulent) while lower risk scores can indicate a lower risk level (e.g., the access request is more likely to be legitimate). If fraudulent access does occur, it may be reported and stored as validity information associated with the corresponding fraudulent access request. This validity information along with the most recent access request data can be used to periodically update the scoring model.

One problem that may arise in resource security systems is that the risk level associated with a particular risk score may change over time. This may occur as resource request behaviors change over time or when the scoring model is updated. The risk level for a score can be based on the distribution of scores over the population. For example, if 10% of the scores for a sampled population are between 50,000 and 100,000, then the score of 50,000 has a top percent risk level of 10%. That is, an access request scoring 50,000 is within the top 10% of the most risky access requests, as scored by the model.

However, the top percent risk of a particular score can change as behaviors for making access requests change. For example, the score of 50,000 may have a top percent risk of 10% in one month but have a top percent risk of 6% in the following month. This change in risk level can occur because the risk level is based on the distribution of scores across the sampled population and the distribution is changing. The distribution of scores can also change when the model is updated since the features and weighting used by the model may be different compared to the old model. Thus, the meaning of the scores has changed over time. For instance, a score of 50,000 is more risky when it is within the top 6% of the population compared to when it is within the top 10% of the population.

The changing distribution of scores and the resulting change in the risk level of those scores (e.g., the percent of the population that the score corresponds to) is problematic because resources providers and resource requesters may rely on predetermined score thresholds to accept or reject access requests. For instance, a resource provider may determine through investigation that 6% of all access requests are fraudulent. Accordingly, the resource provider may select a scoring threshold to reject the top 6% most risky access requests. However, the distribution of scores can change over time, or when the scoring model is updated, as mentioned above. Therefore, the predetermined scoring threshold may no longer correspond to the top 6% most risky access requests. Instead, the predetermined scoring threshold may now correspond to the top 10% most risky access requests, instead of 6% as originally intended. Thus, the predetermined scoring threshold can now cause 10% of access requests to be rejected, instead of only 6%. This is problematic because authorized users legitimately attempting to access resources can be rejected more often. In another situation, where the percentage of the population that the scoring threshold corresponds to decreases over time (e.g., from 6% to 3%), then more fraudulent access requests are being accepted, causing harm to legitimate users. Thus, there is a need for scoring systems and methods that provide consistent scoring over time (e.g., the distribution of scores is consistent).

Embodiments of the invention generate a score transformation table that dynamically adapts to changes in the distribution of scores such that that scores consistently correspond to certain risk levels. Thus, the score transformation table overcomes the problems discussed above. To generate the score transformation table, a scoring profile table is defined to set certain scores to correspond to certain percentages of a population of access requests, and thus, certain risk levels. The set of scores defined in the scoring profile table can be abbreviated compared to the set of potential scores output by the scoring model. For example, the scoring profile table may use abbreviated scores of 0 through 99 while the scores output by the scoring model may have potential output values between 0 and 100,000. The scores output by the scoring model may be referred to as raw scores.

The score transformation table can dynamically associate raw scores with the abbreviated scores defined by the scoring profile table based on the current risk level of the raw score compared to the defined risk level of the abbreviated score. To do this, the distribution of scores is tracked and the risk levels are periodically computed. The defined risk level for an abbreviated score set by the scoring profile can be matched to the closest trending (e.g., current) risk level for a raw score, and these scores can be associated in the update score transformation table. In some embodiments, the trending distribution of scores and corresponding risk levels can be computed by day of week to account for the different patterns and behaviors that occur on different days. Thus, the score transformation table indicates which raw score output by the scoring model corresponds to a particular abbreviated score. Since the score transformation table accounts for the trending risk level of the raw scores, the risk levels of the abbreviated scores is consistent over time, thereby solving the scoring problems discussed above.

Systems and methods for creating and using the score transformation table are further discussed below with respect to the figures.

I. Terms

Prior to discussing embodiments of the invention, description of some terms may be helpful in understanding embodiments of the invention.

The term "resource" generally refers to any asset that may be used or consumed. For example, the resource may be an electronic resource (e.g., stored data, received data, a computer account, a network-based account, an email inbox), a physical resource (e.g., a tangible object, a building, a safe, or a physical location), or other information.

A "resource provider" can include an entity that provides resources for use by users and/or user devices. Examples of resource providers include building or site managers, e-mail service providers, digital storage providers, social media account providers, other website account providers, etc. A resource provider may use an "access server" to authenticate access requests. The access server may store registered authentication information and a scoring model, which can be used in determining whether to grant or deny access to the resources.

The term "access request" generally refers to a request to access a resource. The access request may be received from a requesting computer, a user device, or a resource provider computer, for example. The access request may include authorization information, such as a user name, account number, or password. The access request may also include and access request parameters.

The term "access request parameter" generally refers to information about the access request and when or how it was made. For example, the parameters of an access request may include one or more of: the time that the access request was received, the day of the week that the access request was received, the amount of resources requested, an identifier of the resource, the user, the access device, the user device, or the request computer, an indication of when, where, or how the access request is sent or received. Access request parameters and other associated data may be stored for each access request received by a resource provider computer.

The term "scoring model" or "model" may refer to a machine learning model or a decision tree that determines scores based on the features or parameters of an access request. "Machine learning" generally refers to a variety of different computer-implemented processes that build models based on a population of input data by using features of the entities within the population and determining the relationships between the entities. To build the model, the machine learning process can measure a variety of features of each entity within the population and the features of different entities can be compared to determine the relationships. For example, a machine learning process can be used to predict the attributes of entities according to their features and the relationships between the entities.

The term "raw score" refers to scores output by the scoring model. The raw scores are within the range of potential output values used by the scoring model. For example, one scoring model could outputs scores between 0 and 100,000 while another scoring model could output scores between −500,000 (negative) and 500,000 (positive). In some cases, the raw scores may be transformed to be more usable and/or understanding. For example, the raw scores can be transformed into a shorter, abbreviated form. "Abbreviated scores" may be set to correspond to particular raw scores based on a transformation table or function. For example, abbreviated scores of 0 to 99 can correspond to particular raw scores in the range of 0 to 100,000. In another example, abbreviated scores of 1 to 1,000 can correspond to particular raw scores in the range of −500,000 (negative) and 500,000 (positive). The amount and range of abbreviated scores may be set according to their intended use. The amount of scores in a set of abbreviated scores may be less than the amount of scores in the corresponding set of raw scores (e.g., one or more orders of magnitude less). In the embodiments described herein, higher scores indicate that an access request is more risky (e.g., more likely to be fraudulent) and lower scores indicate that the access request is less risky (e.g., more likely to be legitimate).

The term "top percent risk" or "risk level" corresponds to a particular score and refers to the percentage of the population (e.g., population of access requests sampled by the scoring model) that scores at or above the particular score. For example, if 10% of the sampled population scores between 50 to 99 (out of potential scores of 0 to 99), then the score of 50 is said to be within the top 10% of risk. Also, the "risk level" would be 10% for the score of 50 in this example. When comparing the top percent risk between different scores, a score for an access request at a smaller top percent risk may be said to have a higher risk level compared to another score at a greater top percent risk (e.g., an access request at the top 5% of risk has a higher risk level compared to an access request at the top 10% of risk).

The term "access request outcome" may include any determination of whether to grant access to the resource. The access request outcomes may include "accept," "reject," or "review." An access request outcome of "accept" may cause the access request to be granted. An access request outcome of "reject" may cause the access request to be denied. The "review" outcome may initiate a review process for the access request. The access request outcome for a particular access request may be determined based on the score it is assigned and a predetermined scoring threshold.

The term "reporting" generally refers to a process for identifying whether an access request was fraudulent or legitimate. Reporting may involve a user of a resource reporting fraudulent use to the owner or operator of the resource. Such reporting may be used to determine or adjust validity information (e.g., valid/legitimate or invalid/fraudulent) for the corresponding access request. For example, if a report of fraudulent access to a resource is received, the validity information corresponding to the access request which granted access may be updated to indicate that the access request was fraudulent.

A "user" can be a person or thing that employs some other thing for some purpose. A user may include an individual that may be associated with one or more personal accounts and/or mobile devices. The user may also be referred to as a cardholder, account holder, or consumer in some embodiments.

A "user device" may comprise any suitable computing device that can be used for communication. A user device may also be referred to as a "communication device" or a "computing device." A user device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of user devices include desktop computers, videogame consoles, mobile phones (e.g., cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote or direct communication capabilities. A user device may comprise any suitable hardware and software for performing such functions, and may also include multiple devices or components (e.g., when a device has remote access to a network by tethering to another device—i.e., using the other device as a modem—both devices taken together may be considered a single communication device).

The term "server computer" may include any suitable computing device that can provide communications to other computing devices and receive communications from other computing devices. For instance, a server computer can be a mainframe, a minicomputer cluster, or a group of servers functioning as a unit. In one example, a server computer may be a database server. A server computer may include a database or be coupled to a database and may include any hardware, software, other logic, or combination of the preceding for servicing the requests from one or more client computers. For example, the server computer can include and operate a relational database. A server computer may comprise one or more computational apparatuses and may use any of a variety of computing structures, arrangements, and compilations for servicing the requests from one or more client computers. Data transfer and other communications between computers may occur via any suitable wired or wireless network, such as the Internet or private networks.

The term "providing" may include sending, transmitting, making available on a web page or a software application, displaying or rendering, or any other suitable method of accessing.

A "processor" or "processor circuit" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron, etc.; IBM and/or Motorola's PowerPC; IBM's and Sony's Cell processor; Intel's Celeron, Itanium, Pentium, Xeon, and/or Xscale, etc.; and/or the like processor(s).

A "memory" or "system memory" may be any suitable device or devices that can store electronic data. A suitable memory may comprise a non-transitory computer readable medium (e.g., a computer readable storage medium) that stores instructions that can be executed by a processor to implement a desired method. Examples of memories may comprise one or more memory chips, disk drives, etc. Such memories may operate using any suitable electrical, optical, and/or magnetic mode of operation.

While not necessarily described, messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. For example, messages sent between the user device and the password management server may be sent secure communication protocols such as those listed above.

II. Resource Security System

A resource security system may receive requests to access a resource. In order to determine whether an access request is fraudulent, the resource security system may include an access server for determining a risk score for the access request using a scoring model. The resource security system may also include a configuration system that generates the scoring model based on historical access request data and corresponding validity information. The resource security system is described in further detail below.

FIG. 1 shows a resource security system 100 for providing access to resources, in accordance with some embodiments. The arrows shown in FIG. 1 represent the flow or association of information between the elements of the resource security system 100. The resource security system 100 may be used to provide authorized users access to a resource while denying access to unauthorized users. In addition, the resource security system 100 may be used to deny fraudulent access requests that appear to be legitimate access requests of authorized users (e.g., based on the corresponding authentication information). The resource security system 100 may implement scoring models 132 to identify fraudulent access requests based on the parameters of the access request. The resource security system 100 may periodically update the scoring models 132 based on more recent access request data 172.

The resource security system 100 includes a resource provider computer 110. The resource provider computer 110 may control access to physical resources 114, such as a building or a lockbox, and/or electronic resources 112, such as a local computer account, a digital file or document, a network database, an email inbox, a payment account, or a website login. In some embodiments, the resource provider computer 110 may be a webserver, an email server, or a server of an account issuer.

A user 140 may request access to resources provided by the resource provider computer 110 using an access request message. The resource provider computer 110 may receive an access request from the user 140 via a user device 150 (e.g., a computer or a mobile phone) of the user 140. The resource provider computer 110 may also receive the access request from the user 140 via a request computer 120 coupled with an access device 160 (e.g., a keypad or a terminal). The request computer 120 and the access device 160 may be used in situations where a requesting entity operating the request computer 120 makes the access request on behalf of the user (e.g., a merchant requesting access to a payment account). In some embodiments, the request computer 120 may be a service provider that is different from the resource provider that owns or operates the resource provider computer 110.

The access device 160 and the user device 150 may include a user input interface such as a keypad, a keyboard, a finger print reader, a retina scanner, a biometric reader, a magnetic stripe reader, a chip card reader, a radio frequency identification interface, or a wireless or contactless communication interface, for example. The user 140 may input authorization information into the access device 160 or the user device 150 to access the resource. The authorization information may include one or more of a user name, an account number, a token, a password, a personal identification number, a signature, and a digital certificate, for example. In response to receiving authorization information input by the user 140, the user device 150 or the request computer 120 may send an access request to the resource provider computer 110 along with one or more parameters of the access request. The access request may include the authorization information provided by the user 140.

In one example, the user 140 may enter one or more of an account number, a personal identification number, and password into the access device 160 to request access to a physical resource (e.g., to open a locked security door in order to access a building or a lockbox) and the request computer 120 may generate and send an access request to the resource provider computer 110 to request access to that resource. In another example, the user 140 may operate the user device 150 to input a user name and password as a request for the resource provider computer 110 to provide access to an electronic resource 112 (e.g., a website login or a file) that is hosted by the resource provider computer 110. In another example, the user device 150 may send data or information (e.g., an email) to request the resource provider computer 110 (e.g., an email server) to provide the data or information access to an electronic resource 112 (e.g., deliver the email to an inbox). In another example, the user 140 may provide an account number and/or a personal identification number to an access device 160 in order to request access to a resource (e.g., a payment account) for conducting a transaction. The resource provider computer 110 may also receive access requests in other manners.

In some embodiments, the resource provider computer 110 may verify the authorization information of the access request based on information stored at the request computer 120. In other embodiments, the request computer 120 may verify the authorization information of the access request based on information stored at the resource provider computer 110. The resource provider computer 110 may grant or deny access to the resource based on the verification of the authorization information.

The resource provider computer 110 may receive the access request substantially in real-time, accounting for delays computer processing and electronic communication. Once the access request is received, the resource provider computer 110 may determine parameters of the access request. In some embodiments, the parameters may be provided by the user device 150 or the request computer 120. For example, the parameters of the access request may include one or more of: a time that the access request was received, a day of the week that the access request was received, the source-location of the access request, the amount of resources requested, an identifier of the resource being request, an identifier of the user 140, an identifier of the access device 160, an identifier of the user device 150, an identifier of the request computer 120, a location of the user 140, a location of the access device 160, a location of the user device 150, a location of the request computer 120, an indication of when, where, or how the access request is received by the resource provider computer 110, an indication of when, where, or how the access request is sent by the user 140 or the user device 150, an indication of the requested use of the electronic resource 112 or the physical resource 114, and an indication of the type, status, amount, or form of the resource being requested. In other embodiments, the request computer 120 or an access server 130 may determine the parameters of the access request.

While the resource provider computer 110 may determine that an access request includes proper authentication information, the resource provider computer 110 may send the parameters of the access request to the access server 130 in order to determine whether the access request is fraudulent. The access server 130 may store one or more scoring models 132 for scoring access requests. Different scoring models may be used for different types of access requests, or may be used in different situations. The access server 130 can convert raw scores determined by the scoring model into an abbreviated form using score transformation tables 134. The abbreviated score can be determined based on a scoring profile for the request computer 120 and/or the resource provider computer 110.

The access server 130 can send an indication of the abbreviated score to the request computer 120 and/or the resource provider computer 110. In some cases, the access server 130 can also send an indication of the raw score and the risk level. The request computer 120 and/or the resource provider computer 110 may then accept, review, or reject the access request based on one or more scoring thresholds. For instance, if the score received from the access server 130 is below a "review" threshold value, then the access request may be accepted. And, if the score is above a "reject" threshold value, then the access request may be rejected.

If the access request outcome is "accept," then the resource provider computer 110 may provide the user 140 or the user device 150 access to the resource. If the access request is "reject," then the resource provider computer 110 may not provide the user 140 or the user device 150 access to the resource. If the access request outcome is "review" (e.g., a score below a reject threshold and above a review threshold), then the resource provider computer 110 may initiate a review process for the access request. The review process may involve contacting the user 140 or another entity involved in requesting access (e.g., the resource provider or another service provider).

The resource provider computer 110 may also store validity information for access requests that it receives. The validity information can indicate whether the access request was legitimate or fraudulent. The validity information associated with an access request may initially be based on the corresponding access request outcome. For instance, the validity information may indicate that a granted access request is legitimate and that a rejected access request is fraudulent. The validity information may be updated based on reports received for that access request or based on a review process for that access request. In some embodiments, the access server 130 or the request computer 120 may generate and store the access requests and the validity information.

The scoring models 132 and the score transformation tables 134 implemented by the access server 130 may be created by a configuration system 170. In some embodiments, the functions of the access server 130 and the configuration system 170 may be performed by the same server or servers. The configuration system 170 may generate scoring models 176 and score transformation tables 178 corresponding to the scoring models 176. The scoring models can be generated based on access request data 172 and validity information 174 corresponding to the access request data 172. The access request data 172 and the validity information 174 can be received from the resource provider computer 110 or the access server 130. Some of all of the scoring models 176 and corresponding score transformation tables 178 can be provided to the access server 130 for it to implement for real-time scoring of access requests.

The configuration system 170 may periodically receive new or updated the access request data 172 and validity information 174 from the resource provider computer 110 or the access server 130. The configuration system 170 can then re-generate the scoring models 176 and/or update the score transformation tables 178 based on the new or updated access request data 172 and the validity information 174. As such, the scoring models 176 and the score transformation tables 178 may be based on the most recent patterns of access requests. The configuration system 170 can then send the new or updated scoring models 176 and score transformation tables 178 to the access server 130 to be implemented. The generation of the score transformation tables 178 is further described below.

III. Score Transformation Table Generation

As mentioned above, one problem that may arise in resource security systems is that the risk level associated with a particular risk score may change over time. This may occur as resource request behaviors change over time or when the scoring model is updated because the distribution of scores may change. The changing distribution of scores and the resulting change in the risk level of those scores (e.g., the percent of the sampled population being assigned that score) is problematic because resources providers and resource requesters may rely on predetermined score thresholds to accept or reject access requests. Thus, the amount of percent of access requests that are rejected changes over time. Certain resource providers may handle thousands, millions, or even billions of access requests per day. Thus, even a small change in accept/reject percentages can affect a large number of access requests, enabling fraudulent users to gain access or legitimate users to be denied access. Therefore, there is a need for scoring systems and methods that provide consistent scoring over time (e.g., the distribution of scores is consistent).

Figure 2:
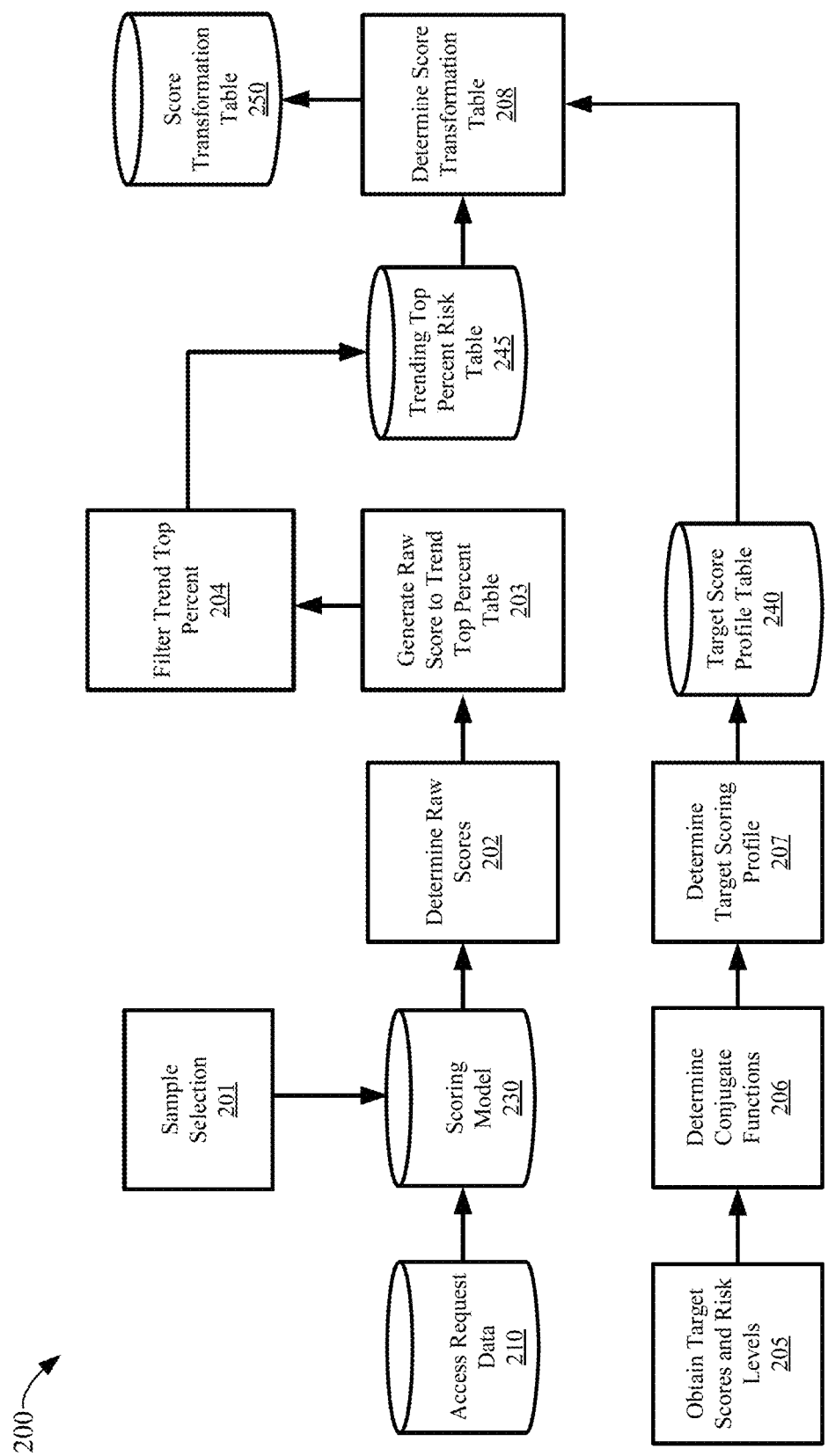
FIG. 2 shows an information flow diagram of a process for building a score transformation table, in accordance with some embodiments.

Embodiments of the invention generate a score transformation table that dynamically adapts to changes in the distribution of scores such that that scores consistently corresponding to certain risk levels. FIG. 2 shows an information flow diagram 200 of a process for building a score transformation table 250, in accordance with some embodiments. The process for building (e.g., generating or determining) the score transformation table 250 can be performed by a configuration system, such as the configuration system 170 described above with respect to FIG. 1. In some embodiments, the process for building the score transformation table 250 can be performed by an access server (e.g., the access server 130 of FIG. 1) or a resource provider computer (e.g., the resource provider computer 110 of FIG. 1).

Prior to building the score transformation table, the configuration system can store access request data 210. The access request data 210 can include information for a plurality of previous (e.g., historical) access requests made to a resource provider computer. The access request data 210 can include the messages sent as part of the access request, the parameters of the access request, and other information associated with the access request (e.g., date, time, and date of week that the access request was made). The access request data 210 can be received from the resource provider computer, the access server, and/or the request computer. The access request data 210 can be updated periodically (e.g., by the minute, hour, day, week, or month). The access request data 210 can be used to build the scoring model 230 and the access requests within the access request data 210 can be scored by that scoring model 230.

The configuration system also stores the scoring model 230. In some embodiments, the scoring model 230 can be the same scoring model currently implemented by an access server (e.g., one of the scoring models 132 implemented by the access server 130 of FIG. 1). In some embodiments, the scoring model 230 can be an updated scoring model built based on updated access request data and its corresponding validity information.

Also prior to building the scoring transformation table 250, a target scoring profile table 240 is created. The target scoring profile table may be associated with a particular request computer (e.g., the request computer 120 of FIG. 1), a particular resource provider computer (e.g., the resource provider computer 110 of FIG. 1), or a particular access server (e.g., the access server 130 of FIG. 1). As further described below, the target scoring profile table 240 includes a target top percent value for each abbreviated score in a set of abbreviated scores (e.g., 0-99) based on a first distribution function (e.g., a normal distribution). That is, the target scoring profile table 240 defines the risk level for each score.

A. Target Scoring Profile

In order to build the target scoring profile table 240, the range or set of abbreviated scores must be defined. In some embodiments, the set of abbreviated scores can includes integers between 0 and 99. In some embodiments, other ranges of abbreviated scores are used (e.g., 1-10, −100 to +100, 0 to 1,000, etc.). The set of abbreviated scores can be predetermined, or it can be set by a user of the configuration system using a graphical user interface.

At step 205, once the set of abbreviated scores is defined, the configuration system can obtain target scores and risk levels. To obtain the target scores and risk levels (e.g., top percent risk), the configuration system can provide a graphical user interface. This graphical user interface can be used by a resource provider entity, a resource requester entity, or an access server entity.

Figure 3:
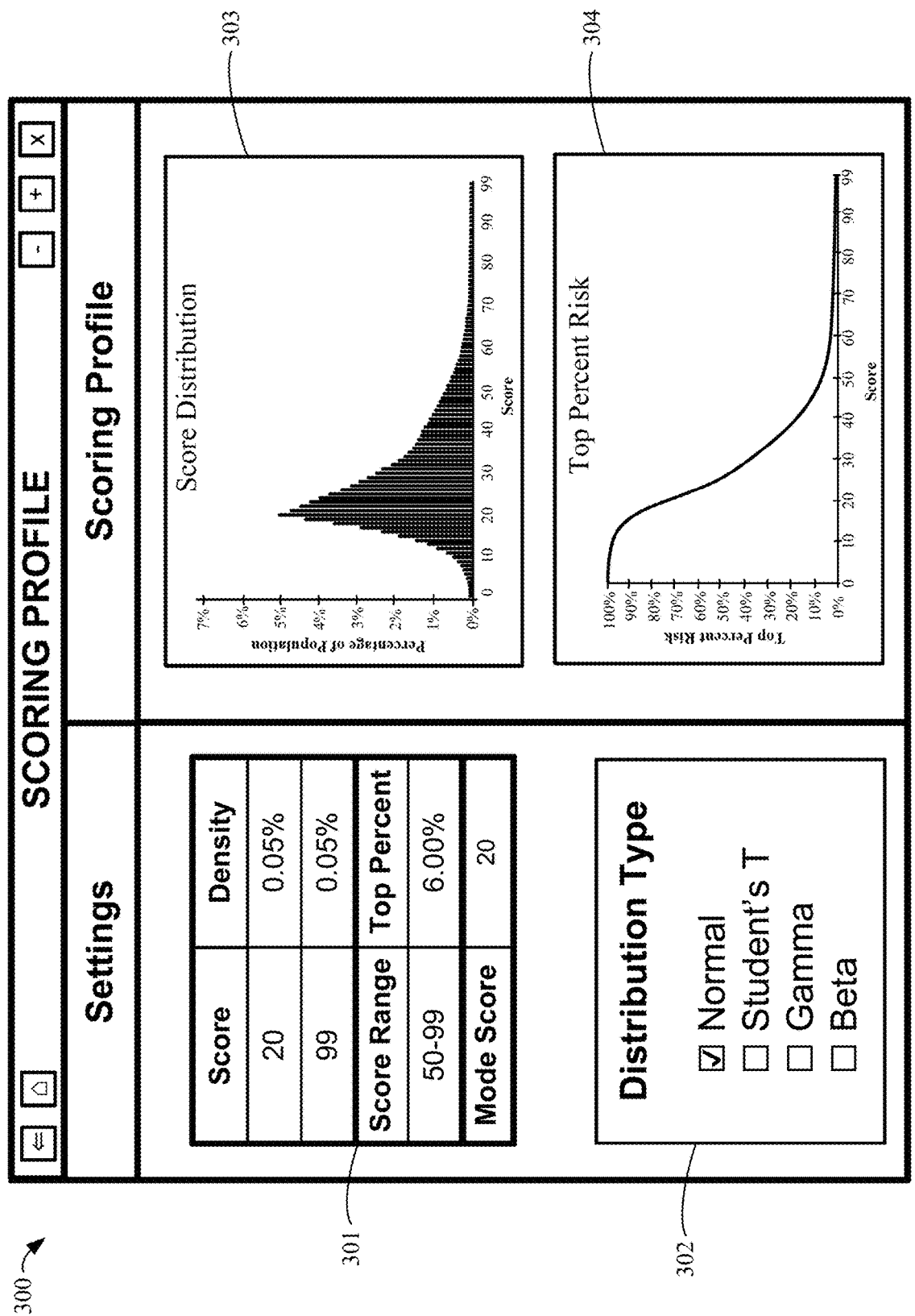
FIG. 3 shows a graphical user interface for creating a target scoring profile, in accordance with some embodiments.

FIG. 3 shows a graphical user interface 300 for creating a target scoring profile, in accordance with some embodiments. The graphical user interface (GUI) can be used for configuring the score transformation table 250. The GUI 300 can include a first user interface element 301 that enables a user (e.g., of the configuration system), different from the user 140 of FIG. 1, to input scoring profile configuration values (e.g., density of a score, top percent value for a range of scores, and the statistical mode of the scores). For instance, the first user interface element 301 can be used to set score densities (e.g., population densities for abbreviated scores and target top percent values for a range of scores. In the example GUI shown in FIG. 3, the user can set the abbreviated score of 20 to have a population density of 0.05% and the abbreviated score of 99 to also have a population density of 0.05%. Accordingly, 0.05% of a sample of historical access requests will be assigned a score of 20 (and 99 likewise) using the scoring model and the score transformation table.

The user may also assign a density percentage to other scores. In addition, the user can set, via the first user interface element 301, a range of abbreviated scores between 50-99 to be at the top 6%. That is, the top 6% of scores determined using the scoring model and the score transformation table on the sample of historical access requests will be within the range of 50-99. The user may also assign a top percent value to other ranges of scores. The user can also set, via the first user interface element 301, a "mode" score (e.g., statistically, the score that will be assigned most frequently) for the distribution used for the scoring profile.

The scoring profile configuration values input by the user can be used to determine a distribution of scores across the entire set of abbreviated scores. This is done using a distribution function. Different types of distribution functions can be used. For example, the distribution function could be a normal distribution, a Cauchy distribution, a student's t-distribution, a logistic distribution, a gamma distribution, or a beta distribution. The GUI can include a second user interface element 302 for selecting a distribution type for the distribution function. If multiple distribution functions are used to map scores to percentages, different distribution types can be used for each distribution. The configuration system can receive inputs to the second user interface element 302 (e.g., selecting a checkbox) where the inputs indicates the distribution type for the distribution function.

These scoring profile configuration values input into the first user interface element 301 along with the distribution type selected in the second user interface element can be used to determine a score distribution, as shown as a graph in a third user interface element 303. For example, the mode of the score distribution can be 20, as set in the first user interface element 301. In addition, the population percentage (e.g., density) for score 0 and 99 can both be 0.05%, as set in the first user interface element 301. The score distribution graph shows frequency counts of each score divided by the total number of sampled access requests across the score range. A fourth user interface element 304 shows a curve of the top percent risk for each score. The top percent risk curve is based on the integral of the score distribution and shows the cumulative of the frequency counts of access requests having a score greater than x, divided by the total number of all access requests. For example, the top percent risk curve in the fourth user interface element 304 shows that the abbreviated scores in the range of 50 to 99 account for the top 6% of the population, as set in the first user interface element 301.

Thus, the graphs in the third user interface element 303 and the fourth user interface element 304 depict the target scoring profile as set by the scoring profile configuration values. The top percent risk curve shown in the fourth user interface element 304 can be represented as a table, which is the target score profile table 240.

As shown in FIG. 3, the top percent risk curve is smooth (e.g., continuously differentiable). The top percent risk curve is smooth because the score distribution that it is based on is defined by a distribution function (e.g., a normal distribution) or several distribution functions. Having a smooth top percent risk curve is advantageous because it provides consistency and predictability. For instance, a score of 51 can predictably be at a slightly lower top percent risk compared to a score of 50. Certain prior scoring systems did not have such consistency and predictability in scoring because their scores are not based on the distribution of raw scores determined by the scoring model.

Figure 4:
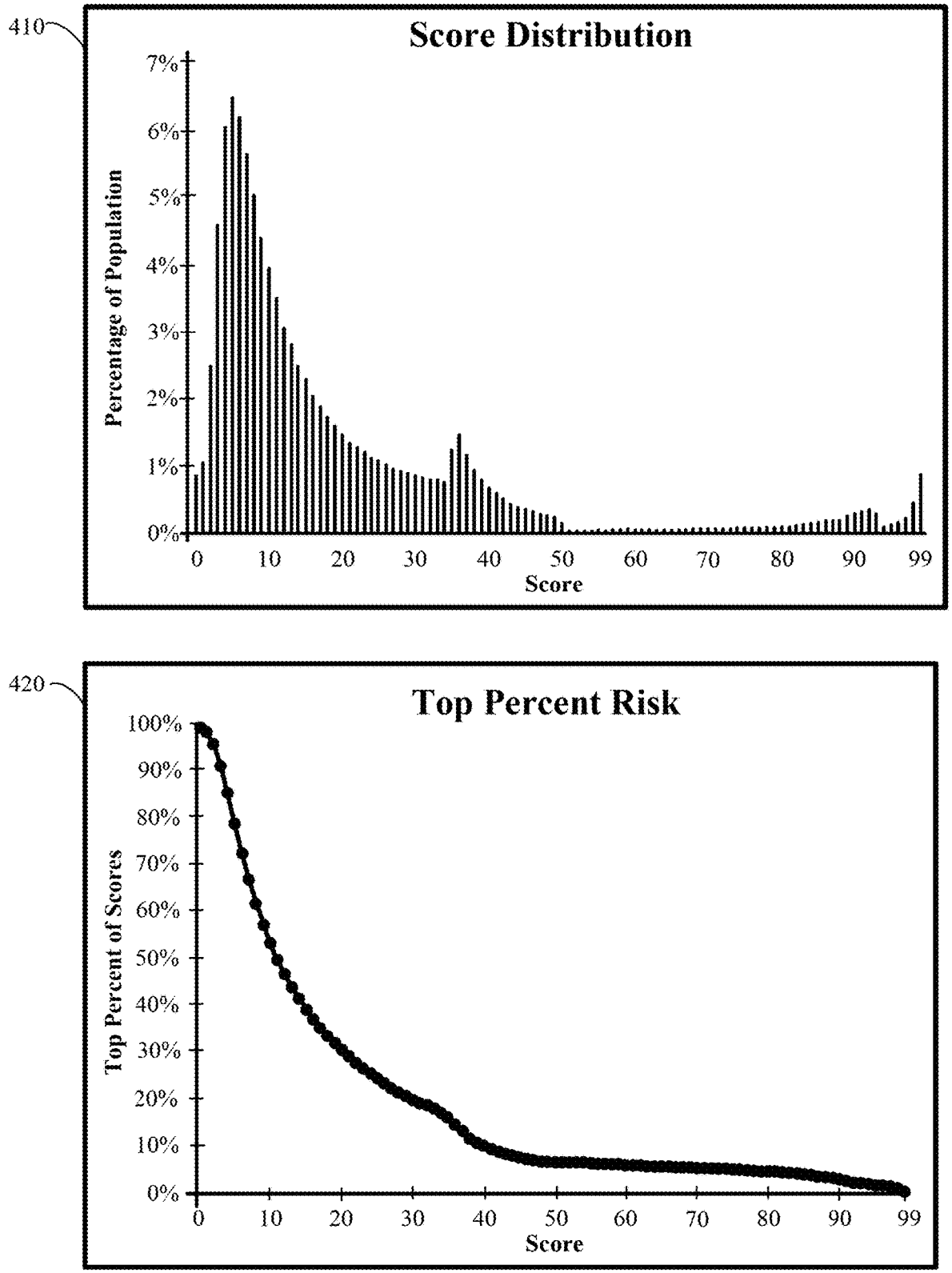
FIG. 4 shows graphs illustrating non-smooth score distributions.

FIG. 4 shows graphs illustrating non-smooth score distributions. These graphs include a score distribution graph 410 and its corresponding top percent risk curve, shown the lower graph 420.

The score distribution shown in graph 410 illustrates some issues that may arise in scoring methods that do not dynamically account for variations in score distribution over time. One issue that can arise is that the concavity of the curve can change, causing the curve to be unsmooth (e.g., the slope at that point changes from positive to negative or from negative to positive). For example, in the score distribution graph 410, the concavity of the curve changes at score 34, score 50, and score 92. This spike in density causes unpredictability in the top percent risk curve, which flips from a concave-up curve between score 10 and score 30 to a concave-down curve between score 31 and 38. Such spikes in the distribution curve may cause unpredictability in decision making by the access server based on such a distribution.

The top percent risk curve then changes back to a concave-up curve at score 39, but then the curve slope flattens between scores 50 and 80. The curve flattens because the density of scores between 50 and 80 is small as shown in the score distribution graph. The high variability in density between adjacent scores causes unpredictability and causes certain scores to lose meaning. For instance, a score of 20 is within the top 27% of risk while a score of 30 is in the top 18% of risk. By contrast, a score of 50 and a score of 60 are both at the top 8% of risk when rounded. Thus, scores between 50 and 60 have little meaning because there is little change in their corresponding risk levels.

The issues in the score distribution and top percent risk curves of prior scoring systems shown in FIG. 4 can arise due to the changes in score distribution over time, which occur based on changes in access request making behavior or scoring model updates, as discussed above.

Figure 5:
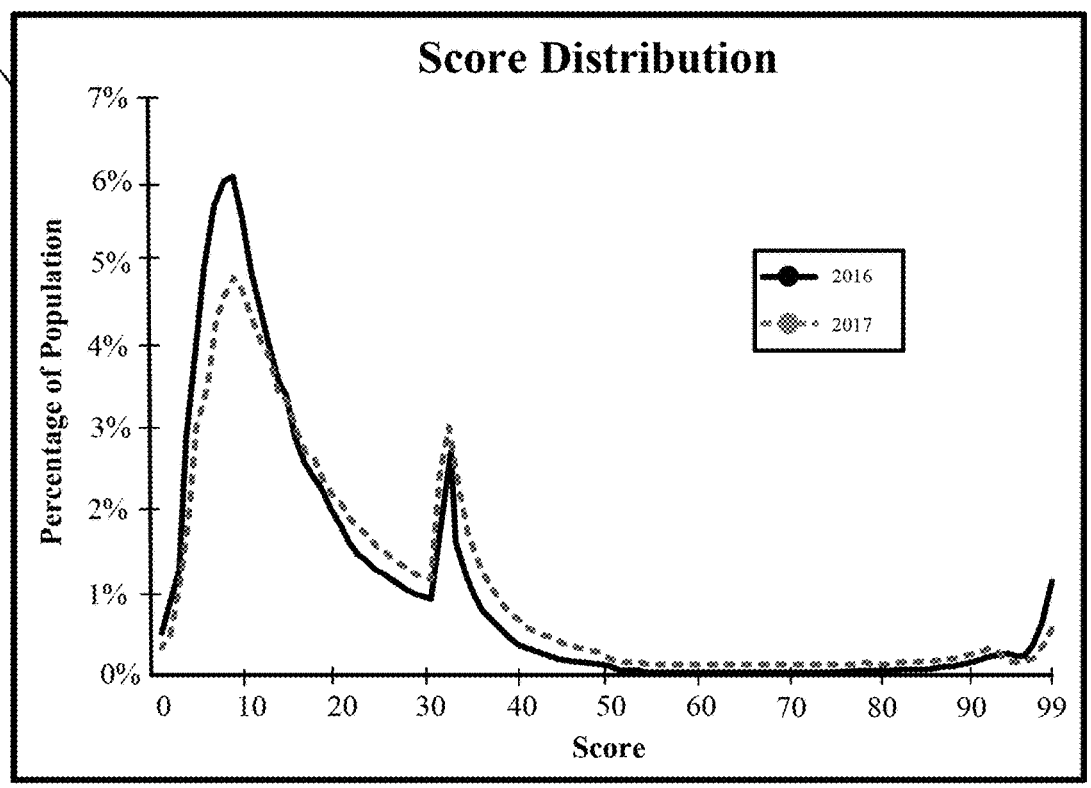
FIG. 5 shows graphs illustrating changes in risk level per score over time.
Figure 5:
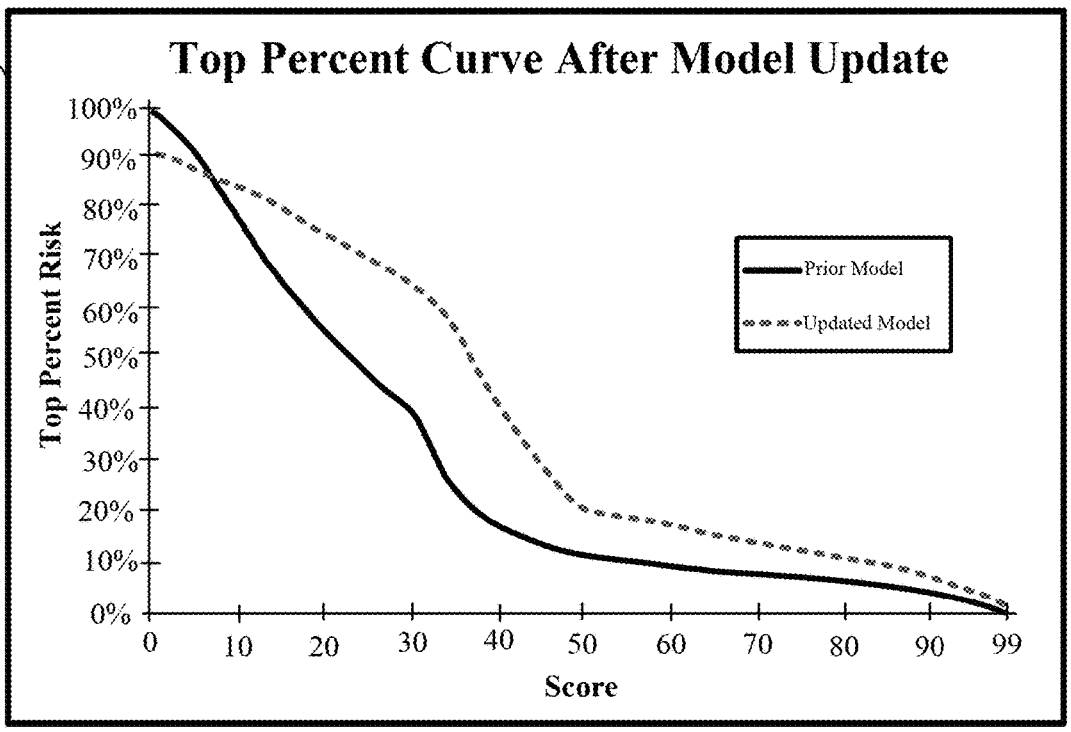

FIG. 5 shows graphs illustrating changes in risk level per score over time. The first graph 501 shows changes in score distribution by month. For example, in a prior scoring system, a score of 10 can correspond to a lower percentage of the population in the year 2017 compared to the year 2016 while a score of 40 can correspond to a greater percentage in the year 2017 compared to score 40 in 2016. The second graph 502 shows an example of the changes in top percent risk that can occur in prior scoring systems when the scoring model is updated. As shown in the second graph 502, the score of 30 can corresponding to the top 40% most risky access requests in the prior model while the score of 30 corresponds to the top 65% most risky access requests in the updated model. This drastic change in the top percent risk curve is disadvantageous because the score is 30 is much less risky in the updated model compared to the prior model.

Figure 6:
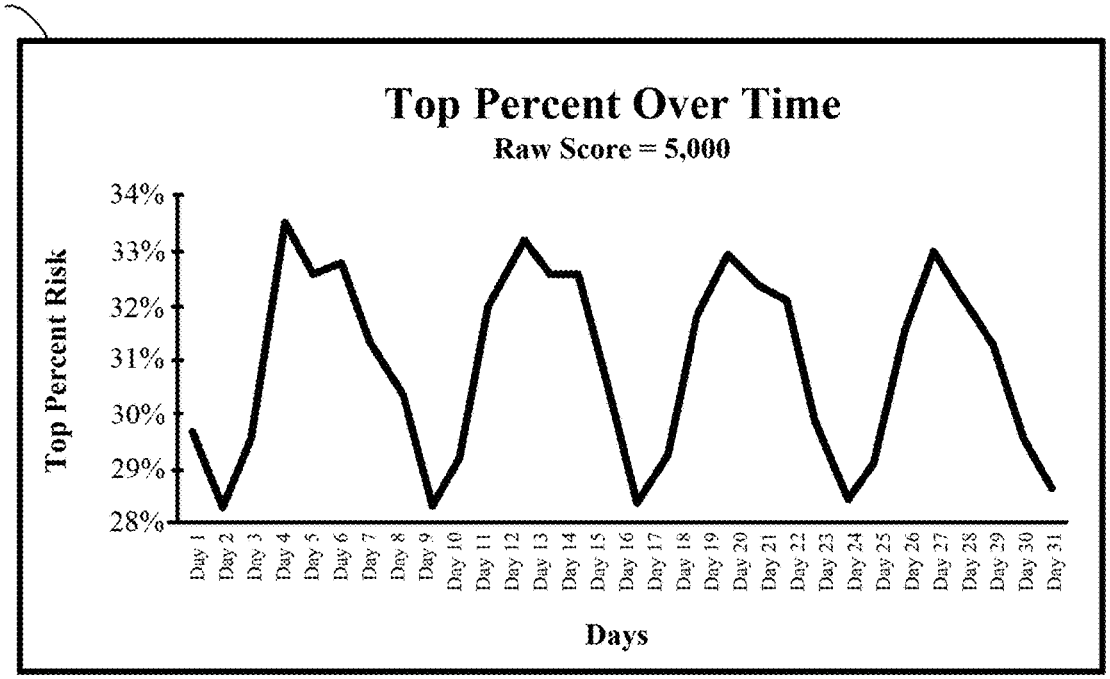
FIG. 6 shows graphs illustrating risk level oscillation by day of week.
Figure 6:
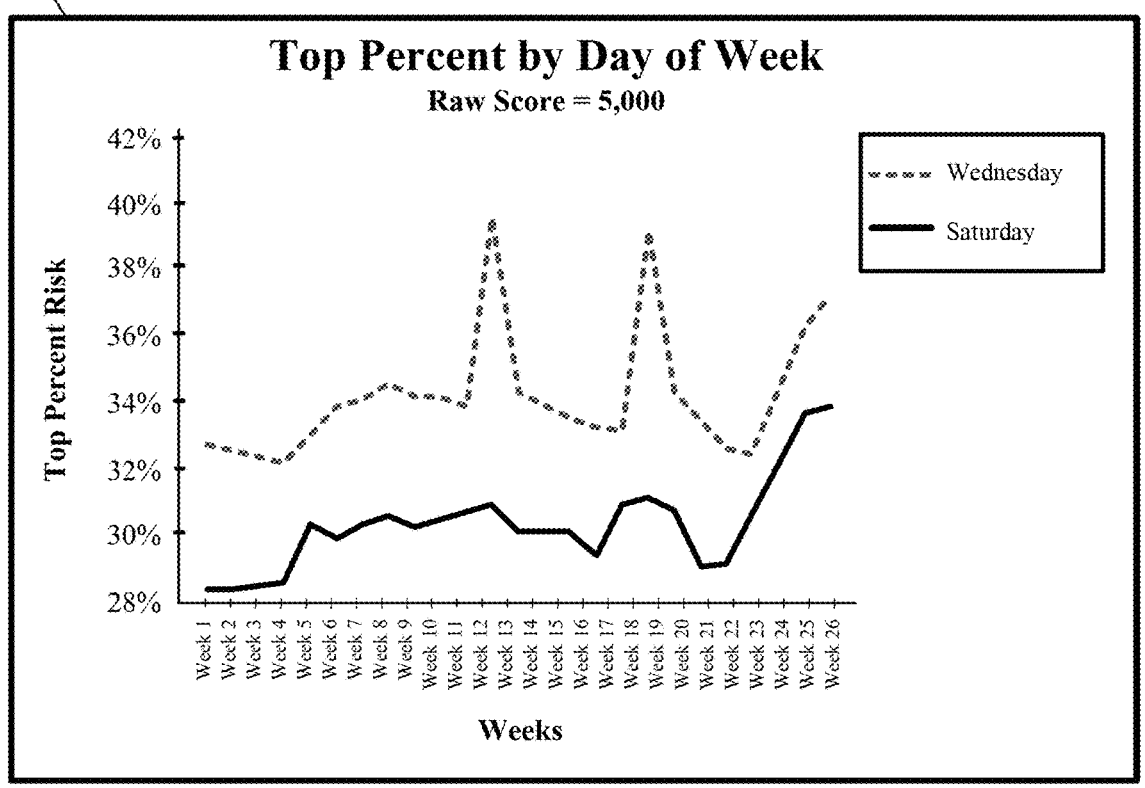

In addition, the risk level of scores in prior score systems can vary day-by-day. FIG. 6 shows graphs illustrating risk level oscillation by day of week. As shown in the first graph 601, the top percent risk curve for the same score (e.g., the raw score of 5,000) can oscillate up and down each week over a month. For instance, the raw score of 5,000 can corresponds to the top 28% most risky access requests on the $9^{th}$ day of a month but then correspond to the top 33% most risky access requests on the $12^{th}$ day of the month. In addition, as shown in the second graph 602, the top percent risk curve for the same score (e.g., the raw score of 5,000) can be different on different days of the week. For instance, the raw score of 5,000 can correspond to the top 39% most risky access requests on Wednesday of the $12^{th}$ recorded week while the same raw score of 5,000 corresponds to the top 31% most risky access requests on Saturday of the same week (the $12^{th}$ recorded week). This oscillation can occur even when the scoring model considering the day of the week and/or date of the month it its scoring calculation. The drift and oscillation of the distribution of scores, and the resulting changes in the top percent risk curves, as shown in FIGS. 4, 5, and 6 is disadvantageous because resource providers and resource requesters may not be able to rely on the score number itself, since the meaning has changed.

The score transformation table 250 of FIG. 2, which is dynamically adjusted to account for changes in the score distribution over time and day-by-day, solves the problems experienced by prior scoring systems. Unlike the top percent risk curves of prior scoring systems, the top percent risk curve shown in the graph of the fourth user interface element 304 of FIG. 3 (representative of the score transformation table 250) is smooth and predictable.

At step 206 of FIG. 2, in order to create a smooth top percent risk curve, the configuration system can determine conjugate functions, and use the conjugate functions to modify distribution functions to map to the target scores and corresponding risk levels input by the user (e.g., as shown in first user interface element 301 of FIG. 3).

Figure 7:
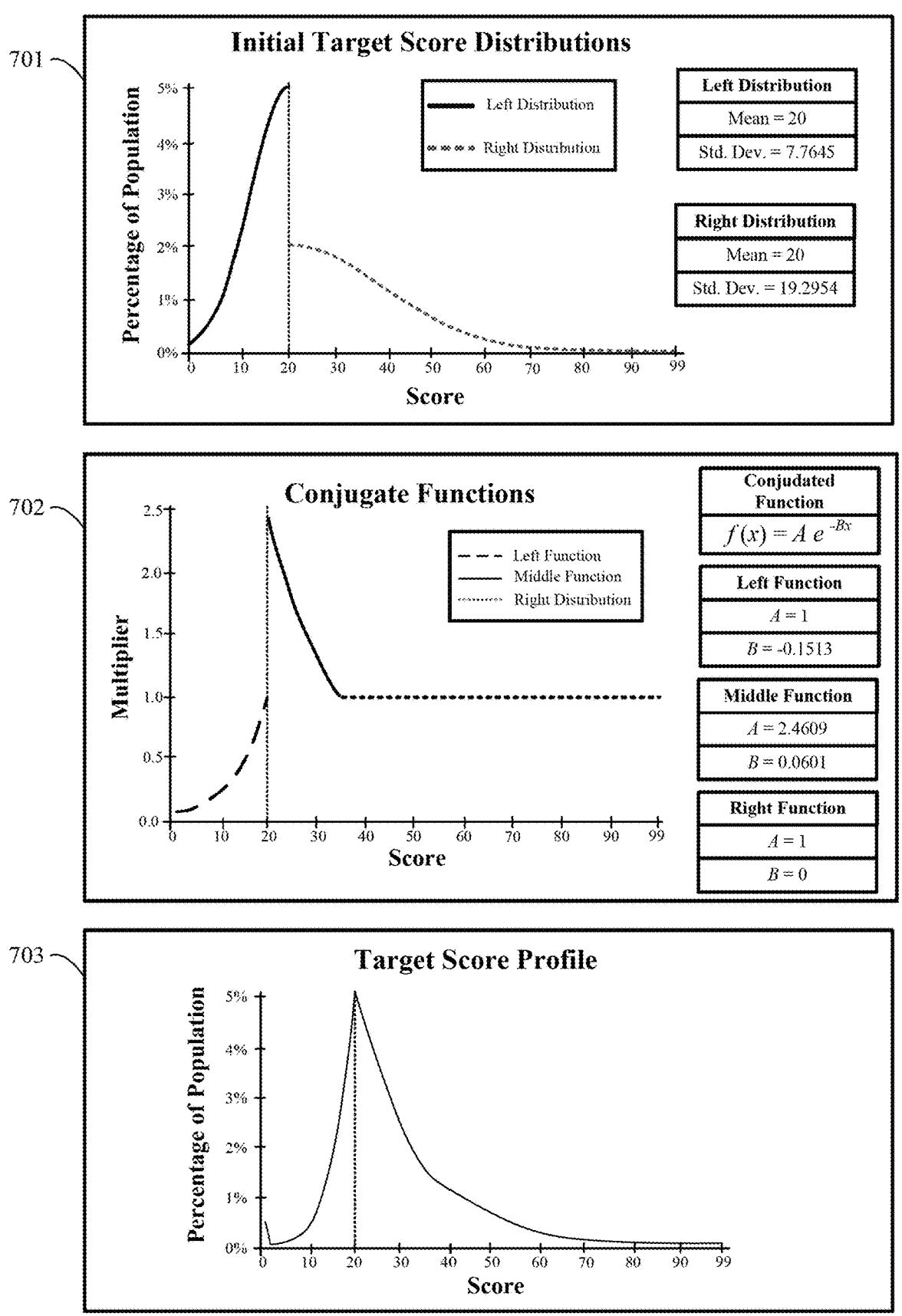
FIG. 7 shows graphs of a target scoring profile based on distribution functions and conjugate functions, in accordance with some embodiments.
Figure 8:
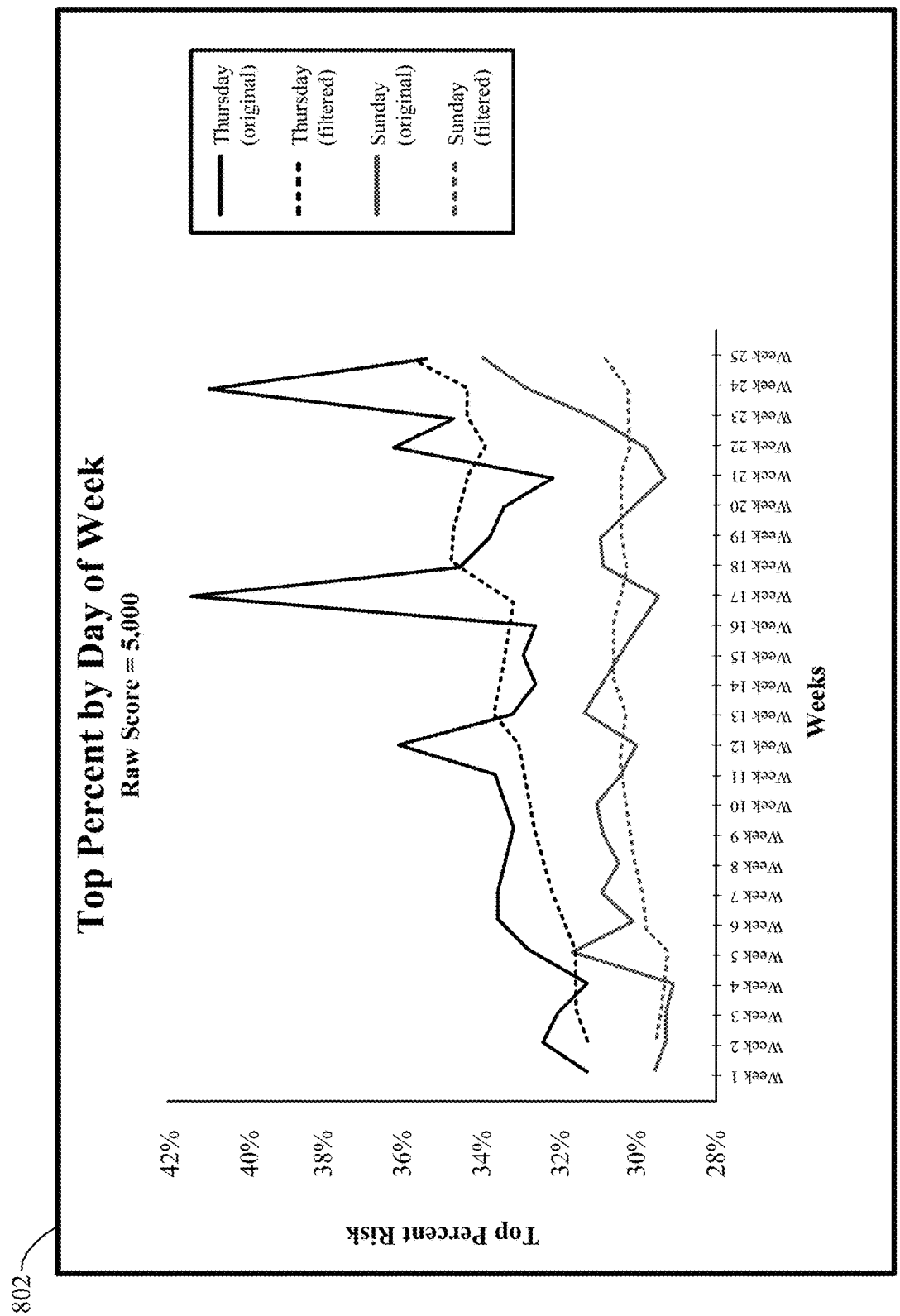
FIG. 8 shows graphs illustrating filtering the top percent risk values for a score, in accordance with some embodiments.

FIG. 7 shows graphs of a target scoring profile based on distribution functions and conjugate functions, in accordance with some embodiments. The first graph 701 of FIG. 7 shows two normal distribution functions. The first normal distribution on the left side of the graph 701 has a mean of 20 and a standard deviation of 7.7645 and is graphed from score 0 to score 20. This left distribution function is determined based on the score of 20 being set to the top 50% of risk in the first user interface element 301 of FIG. 3. Thus, the mean (20) and the standard deviation (7.7645) are determined based on the score of 20 being set to the top 50% of risk. Accordingly, area under the curve of the first distribution function between score 0 and score 20 is 50%, corresponding to the top 50% of risk. The configuration system can determine the mean to use for the distribution functions based on the scoring profile configuration values input by the user.

A second distribution function, shown in the right side of the first graph 701 is determined based on the score of 50 being set to the top 6% of risk in the first user interface element 301 of FIG. 3. The right distribution is determined to be a normal distribution having a mean of 20 (the same as the left distribution) and a standard deviation of 19.2956. The mean (20) and the standard deviation (19.2956) are determined based on the score of 50 being set to the top 6%. Accordingly, the area under the curve of the second distribution between score 50 and score 99 is equal to 6%, corresponding to the top 6%. The mean of the second distribution is determined to be 20 such that the second distribution has the same mean as the first distribution.

As shown in the first graph 701, the left distribution and the right distribution are not equal at score 20. A conjugated function, as shown in the second graph 702, is applied to each point (e.g., score) on the first graph 701 to create a target score profile curve that is smooth (e.g., the left distribution and right distributions in the first graph 701 are multiplied by the conjugated function in the second graph 702). The conjugate function may be an exponential probability distribution. For example, the conjugated function can be defined as shown in formula (1) below:

$$f(x)=Ae^{-Bx} \quad (1)$$

The term "conjugate function," as used herein, refers to a set of curves/functions (e.g., those in the second graph 702) that can be applied (e.g., using multiplication) to disjoint left and right distribution curves (e.g., the first and second distribution functions in the first graph 701) such that the resulting curve is smooth (e.g., the curve in the third graph 703). As shown in the second graph 702, the "conjugate function" can have left, middle, and right portions where different variables are used (e.g., different values of A and B). Thus, the conjugate function acts as an adjustment function to create a smooth connection between two non-continuous functions (e.g., two functions that are not continuously differentiable).

As shown in the second graph 702, the conjugated function between scores 0 and 20 is defined by setting variable A equal to 1 and variable B equal to −0.1513. The conjugated function between scores 20 and 35 is defined by setting variable A to 2.4609 and variable B to 0.0601. The conjugated function between scores 35 and 99 is defined by setting variable A to 1 and variable B to 0. The configuration system then applies the conjugated function shown in the second graph 702 to the left and right distribution functions shown in the first graph 701 of FIG. 7. The resulting graph is called the target score profile and is shown in the third graph 703 of FIG. 7. By multiplying the left distribution by the conjugated function between scores 0 and 20, the target score profile curve is made lower and steeper compared to the left curve, due to the conjugated function values at those points being below 1. By multiplying the right distribution by the conjugated function between scores 20 and 35, the target score profile curve is increased compared to the right distribution of the first graph 701 such that it meets and is equal to the left distribution function as modified by the conjugated function. This is a result of the conjugated function being greater than 1.0 between scores 20 and 35. As shown in the third graph, the left distribution modified by the conjugated function is equal to the right distribution as modified by the conjugated function are equal (e.g., both are at 5%). Furthermore, the conjugated function is equal to 1 from scores 35 to 99, and thus, the target score profile curve from scores 35 to 99, as shown in the third graph 703, is not modified from the right distribution shown in the first graph 701. The variables A and B in the left, middle, and right conjugate function are set such that the left distribution and the right distribution, as modified by the conjugated function, are equal to each other at score 20.

Thus, at step 207 of FIG. 2, the configuration system has determined the target scoring profile. The points along the target scoring profile can be converted into a target score profile table 240. An example of the target score profile table 240 is shown in Table 1 below. As shown in Table 1, the score of 20 is set to 50%, the score of 50 is set to 6%, as discussed above. In Table 1 below, only a few of the target scores are shown for simplicity. Scores not shown are indicated by an ellipsis ( . . . ). The target score profile table 240 is used in generating the score transformation table 250, as further described below.

TABLE 1

| Target Score Profile | |
|---|---|
| Target Score | Top Percent Risk |
| 5 | 99.29% |
| . . . | . . . |
| 20 | 50% |
| . . . | . . . |
| 36 | 22.77% |
| . . . | . . . |
| 45 | 12.01% |
| . . . | . . . |
| 50 | 6% |
| . . . | . . . |
| 88 | 0.57% |
| . . . | . . . |
| 94 | 0.26% |
| . . . | . . . |

B. Trending Top Percent Risk Table

To determine the score transformation table 250, a dynamic trending top percent risk table 245 (e.g., determined using current data) is mapped to the target scoring profile table 240. The target scoring profile table 240 defines the target scores and their corresponding risk levels while the trending top percent risk table 245 dynamically adapts to changes in score distribution over time.

At step 201, to generate the trending top percent risk table 245, a sample of the previous access requests stored in the access request data 210 are selected. In some embodiments, the trending top percent risk table 245 accounts for differences in score distribution and risk level across different weekdays. In such embodiments, seven different samples are selected from the access request data 210, one for sample for each day of the week. The samples can be selected based on a maximum number of samples and/or a minimum number of samples. For example, the sample data may be selected to include a minimum of 1,000,000 samples. The sample access requests can also be selected based on a timeline. For example, access requests made in the last 7 days, or the last 14 days, etc., can be used for the sample. Furthermore, where the day of week is accounted for, the sample selection for Mondays can be based on the last 7 Mondays, or the last 14 Mondays, for example. The configuration system can provide a sample selection user interface enabling a user to set sample data collection criterion (e.g., sample size, timeline within which to pull samples, days of the week to sample, etc.). The configuration system can receive the sample data selection criterion from the user via the sample selection user interface element of the graphical user interface. The configuration system can use the sample selection criterion to sample the historical access requests.

At step 202, the sampled access requests can be scored by the scoring model 230, which can determine raw scores for each of the access requests. Then, the top percent risk for each raw score can be determined based on the distribution of scores for each sample. For instance, the top percent risk for each potential output value (e.g., 0-100,000) can be determined for Mondays, Tuesdays, and the other weekdays. The top percent risk values for each sample selection (e.g., for each day of the week) and the corresponding raw scores are defined in the trending top percent risk table 245. These top percent risks are called "trending" top percent risks because the configuration system can update (e.g., recalculate) the trending top percent risk table 245 periodically (e.g., every day, every 7 days, bi-weekly, or monthly). Thus, the trending top percent risk table 245 ensures that the score transformation table 250 accounts for changes in score distribution over time, and by weekday. An example of the trending top percent risk table 245 is shown in Table 2 below. As shown in Table 2, the same raw score may correspond to a different top risk percent on different days of the week. In Table 2 below, only a few of the raw scores are shown for simplicity. Scores not shown are indicated by an ellipsis ( . . . ). The trending top percent risk table 245 is used in determining the score transformation table 250, as further described below.

TABLE 2

Trending Top Percent Risk
Trending Top Percent Risk

| Raw Score | Top % Risk Sunday | Top % Risk Monday | Top % Risk Tuesday | Top % Risk Wednesday | Top % Risk Thursday | Top % Risk Friday | Top % Risk Saturday |
|---|---|---|---|---|---|---|---|
| . . . | . . . | . . . | . . . | . . . | . . . | . . . | . . . |
| 3,717 | 42.0242% | 43.2262% | 43.8287% | 45.1392% | 45.2397% | 44.9573% | 41.8744% |
| . . . | . . . | . . . | . . . | . . . | . . . | . . . | . . . |
| 13,849 | 12.0138% | 13.2437% | 13.5678% | 15.9845% | 16.3457% | 14.5646% | 12.8753% |
| . . . | . . . | . . . | . . . | . . . | . . . | . . . | . . . |
| 90,282 | 2.2911% | 2.6458% | 2.9855% | 3.8743% | 3.9374% | 2.7563% | 2.1782% |
| . . . | . . . | . . . | . . . | . . . | . . . | . . . | . . . |
| 99,879 | 0.2552% | 0.2236% | 0.3587% | 0.4513% | 0.5274% | 0.3567% | 0.2655% |
| . . . | . . . | . . . | . . . | . . . | . . . | . . . | . . . |

As shown in Table 2 above, and discussed above with respect to FIG. 6, the risk level (e.g., the top % top) for a particular score may oscillate up and down depending on the weekday.

In some embodiments, the configuration system determines the trending top percent values for a subset of the potential outcome values. For instance, the configuration system can determine the trending top percent values for a certain percentage (e.g., 10% or 1%) of the potential outcome values. The trending top percent values for the remaining percentage can be determined using a linear transformation based on the other trending top percent values (e.g., those determined directly). The percent of can be determined based on the total number of potential outcome values for the scoring model.

At step 204, to reduce variability across weekdays, the configuration system can filter the top percent risk values for each weekday. The filter can adjust the top percent risk values based on a moving or weighted average. For instance, the configuration system can determine the average of the top percent risk values for the current Wednesday and the top percent risk values a certain number of the previous Wednesdays (e.g., the past 4, 7, or 14 Wednesdays, etc.). The filtering can be performed using any suitable digital filter (e.g., a Kalman filter). The configuration system can determine different weighting factors to be used in filtering the top percent risks for different weekdays. The configuration system can select a lower weighting factor (e.g., more filtering) on weekdays that are noisier (e.g., Wednesdays, as shown in the second graph 602 of FIG. 6). The configuration system can select a higher weighting factor (e.g., less filtering) on less noisy week days (e.g., Saturdays, as shown in the second graph 602 of FIG. 6). The trending top percent risk table 245 is then updated to include the filtered trending top percent risks. Thus, the trending top percent risk table 245 and the score transformation table 250 can account for variations in risk level by day of week.

The configuration system can include user interface elements for configuring the filtering step described above. The configuration system can provide a graphical user interface including a filtering user interface element for indicating or inputting a digital filter identifier identifying a type of digital filtering algorithm (e.g., Kalman filter) and weighting factors (e.g., 0.2, or 0.5, etc.) to use in filtering the trending top percent values for each potential output value. The configuration system can receive input to the filtering user interface element from a user. The input can include the digital filter identifier identifying the type of digital filtering algorithm to use and the weighting factor to use. In addition, the configuration system can provide a weighting factor user interface element that presents one or more graphs of trending top percent risk curves, and/or one or more tables corresponding to the one or more graphs of trending top percent risk curves. Each of the graphs and tables can be based on different weighting factors and filtering algorithm types.

C. Score Transformation Table

At step 208, after determining the target score profile table 240 and the trending top percent risk table 245, the configuration system can determine the score transformation table 250. As discussed above, the target score profile table 240 maps abbreviated target scores (e.g., 0 to 99) to target top percent risk values (e.g., 50% for score 20 and 6% for score 50, as shown in Table 1) while the trending top percent risk table 245 maps raw scores within the potential output values of the scoring model 230 (e.g., scores between 0 and 100,000) to the trending top percent risk recently determined by the configuration system (e.g., 42.0242% for raw score 3,717 on Sundays and 2.7563% for raw score 90,282 on Fridays, as shown in Table 2). The configuration system can determines the score transformation table 250 using the target score profile table 240 and information from the trending top percent risk table 245.

For each abbreviated score in the target score profile table 240, the configuration system can determine the potential output value (e.g., raw score) in the trending top percent risk table 245 that is within a threshold of the target top percent risk associated with that abbreviated score in the target score profile table 240. In some embodiments, the configuration system can determine the potential output value (e.g., raw score) in the trending top percent risk table 245 that, compared to other potential output values, has the closest trending top percent risk to the target top percent risk associated with that abbreviated score in the target score profile table 240. The configuration system can associate that raw score with the abbreviated score.

For example, a target score profile table 240 can have the abbreviated score of 50 set to a target top percent risk of 6%, meaning that an access request being scored at 50 would be in the top 6% of riskiest access requests (e.g., riskier than 94% of access requests). In this example, the trending top percent risk table 245 can have the potential output value of 45,743 associated with a trending top percent risk of 6.0024%. That is, out of the training sample, the raw score of 45,743 is in the top 6.0024% of the most risky access requests (e.g., a raw score of 45,743 is riskier than 93.9976% of access requests in the sample of access requests). In this example, the trending top percent risk table 245 associates the raw score of 45,742 with a trending top percent risk of 5.9912%. For the potential output value of 45,743, the difference between its associated top percent risk (6.0024%) and the target top percent risk (6%) for the abbreviated score of 50 is 0.0024%. For the potential output value of 45,742, the difference between its associated top percent risk (5.9912%) and the target top percent risk (6%) for the abbreviated score of 50 is 0.0088%. Therefore, the difference (0.0024%) between the top percent risk value (6.0024%) and the target top percent risk value (6%) for the potential output value of 45,743 is less than the difference (0.0088%) between the top percent risk value (5.9912%) and the target top percent risk value (6%) for the potential output value of 45,743 (e.g., 0.0024% is less than 0.0088%). Thus, the potential output score of 45,743 has a top percent risk value that is closer to the target top percent risk value compared to the potential output score of 45,742 (and every other potential output value).

In other embodiments, the configuration system can use a threshold value to identify a corresponding potential output value. In such embodiments, the more than one potential output value may have a trending top percent risk value that is within the threshold.

Thus, the score transformation table 250 can provide abbreviated risk scores that maintain a consistent risk level over time and provider predictability day-by-day even though the raw scores output by the scoring model 230 have risk levels that drift over time and that oscillate day-by-day. An example of the trending top percent risk table 245 is shown in Table 3 below. As shown in Table 3, the same raw score may correspond to a different top risk percent on different days of the week. In Table 3 below, only a few of the target scores, corresponding raw scores, and correspond target and trending top percent risks are shown for simplicity. In addition, Table 3 below only scores the trending top percent risk for Mondays for simplicity, but the score transformation table 250 can include trending top percent risks for each weekday. Scores not shown are indicated by an ellipsis ( . . . ).

TABLE 3

Score Transformation Table

| Target Score | Top Percent Risk | Trending Top % Risk Monday | Raw Score |
|---|---|---|---|
| . . . | . . . | . . . | . . . |
| 5 | 99.29% | 99.2916% | 870 |
| . . . | . . . | . . . | . . . |
| 20 | 50% | 50.0254% | 1,926 |
| . . . | . . . | . . . | . . . |
| 36 | 22.77% | 22.7717% | 6,800 |
| . . . | . . . | . . . | . . . |
| 45 | 12.01% | 12.0138% | 13,849 |
| . . . | . . . | . . . | . . . |
| 50 | 6% | 6.0024% | 45,743 |
| . . . | . . . | . . . | . . . |
| 88 | 0.57% | 0.5697% | 99,631 |
| . . . | . . . | . . . | . . . |

TABLE 3-continued

Score Transformation Table

| Target Score | Top Percent Risk | Trending Top % Risk Monday | Raw Score |
|---|---|---|---|
| 94 | 0.26% | 0.2552% | 99,879 |
| . . . | . . . | . . . | . . . |

D. Exemplary Method for Processing Access Requests

Figure 9:
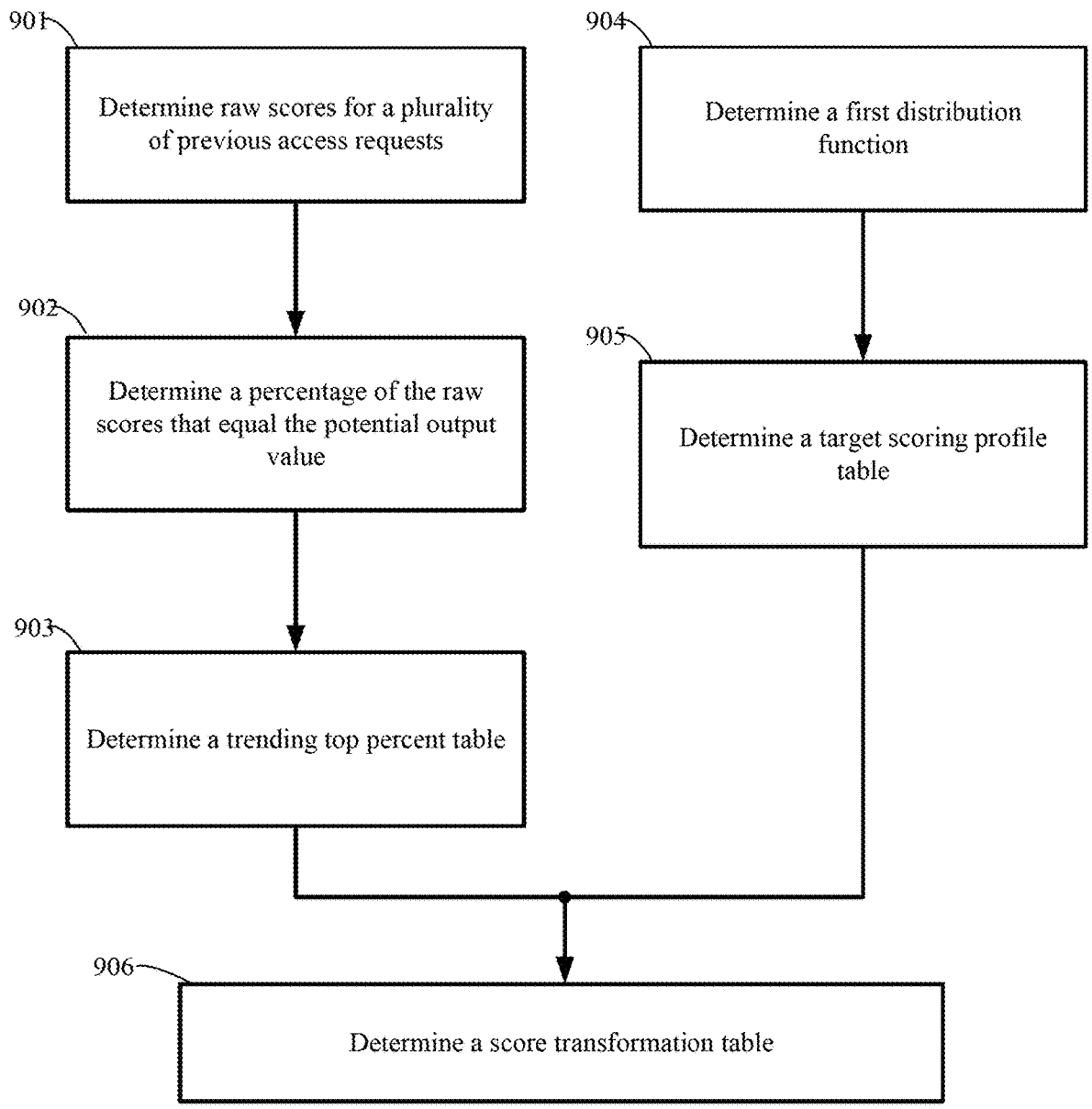
FIG. 9 shows a flowchart of a method for processing access requests, in accordance with some embodiments.

An exemplary method for processing access requests can be performed by a computer system, such as the configuration system described above. FIG. 9 shows a flowchart of a method for processing access requests, in accordance with some embodiments. At step 901, the method can include determining, by the computer system using a scoring model, raw scores for a plurality of previous access requests. Each of the raw scores determined sing the score model can be within a set of potential output values of the scoring model. For example, the scoring model may have potential output values of integers between, and including, 0 and 100,000. The scoring model may assigned each access request of the previous access requests a raw scores from this set of numbers. The plurality of previous access requests can be obtained by taking a sample from a larger set of stored access requests.

In some embodiments, the wherein the scoring model can generated based on validity information corresponding to the plurality of previous access requests. The scoring model can be generated by the computer system. The validity information can indicate whether each access request of the plurality of previous access requests is fraudulent or legitimate. The validity information and the plurality of previous access requests can be received from a resource provider computer, a request computer, or an access server.

At step 902, the method can further include determining, by the computer system for each potential output value of the set of potential output values, a percentage of the raw scores that equal the potential output value. That is, the computer system can determine the distribution of the raw scores for the plurality of access requests across the potential raw scores (e.g., 0-100,000). This percentage represents the density of the raw scores in the sample.

At step 903, The method can further include determining, by the computer system, a trending top percent table. The trending top percent table can include a trending top percent value for each potential output value. The trending top percent value for a particular potential output value can be based on the percentages of the raw scores that are equal to or greater than the potential output value.

In some embodiments, the trending top percent table can include trending top percent values for each potential output value (e.g., each raw score) for each weekday (e.g., Monday, Tuesday, etc.). In such embodiments, the determining of the percentage of the raw scores that equal the potential output value can be performed for each weekday based on raw scores for previous access requests occurring on that weekday.

In some embodiments, the method can further include filtering, by the computer system using a filtering algorithm, the trending top percent values for each potential output value for each weekday. The trending top percent values can be filtered using a filtering algorithm (e.g., a Kalman filter) based on historical trending top percent values for the potential output value on the weekday.

At step 904, the method can further include determining, by the computer system, a first distribution function using a first predetermined top percent value for a first abbreviated score of a set of abbreviated scores (e.g., 0-99). The method can further include determining parameters of the distribution function (e.g., a particular mean and standard deviation). In some embodiments, the set of abbreviated scores can be at least one order of magnitude smaller than the set of potential output values of the scoring model. The first distribution function can map each abbreviated score in the set of abbreviated scores to a target population percentage for the abbreviated score. A type of the first distribution function can be a normal distribution, a Cauchy distribution, a student's t-distribution, a logistic distribution, a gamma distribution, or a beta distribution. The set of abbreviated scores includes the first abbreviated score. The abbreviated score and the corresponding target population percentage can be based on a target top percent risk value set in a graphical user interface.

At step 905, the method can further include determining, by the computer system, a scoring profile table. The scoring profile table can includes a target top percent value for each abbreviated score in the set of abbreviated scores (e.g., 0-99) based on the first distribution function.

In some embodiments, the method can further include determining, by the computer system, a second distribution function using a second predetermined top percent value for a second abbreviated score. The scoring profile table can be determined based on the second distribution function. In some embodiments, a type of the first distribution function can be different than a second type of the second distribution function.

In some embodiments, the method can further include determining, by the computer system, one or more conjugate functions based on the first distribution function and the second distribution function. Then, the method can further include transforming, by the computer system, at least one of the first distribution function and the second distribution function using one or more conjugate functions. The scoring profile table can be determined based on the transformation using the one or more conjugate functions. The conjugate functions can enable multiple predetermined top percent values to get set for corresponding abbreviated scores, which may require multiple distribution functions in order to be map the score distribution to fit the multiple predetermined top percent values.

At step 906, the method can further include determining, by the computer system, a score transformation table. The computer system can determine the score transformation table by determining, for each abbreviated score in the set of abbreviated scores (e.g., 0-99 score), a corresponding potential output value (e.g., 0-100,000 raw score). The corresponding potential output value can be determined based on the trending top percent value for the corresponding potential output value being within a threshold of the target top percent value for the abbreviated score. The threshold can be a predetermined percent value, such as 0.0005%, 0.01%, 0.05%, or 0.1%, for example. The threshold can also be used to determine the trending top percent value that is closest to the target top percent value. That is, the configuration system can determine the potential output value of the scoring model that has a trending top percent value that is closer to the target top percent value for the abbreviated score compared to the trending top percent values for other potential output values. The score transformation table can be configured to determine a first abbreviated score based on a first raw score for a first access request, where the first raw score can be determined using the scoring model. The score transformation table may be used by an access server to score access requests. The first abbreviated score can indicate an access request outcome for the first access request (e.g., accept, review, or reject). The access request outcome can also be based on a scoring threshold set by a resource provider computer or a request computer.

While the steps 901-906 in FIG. 9 are shown as occurring in sequence, these steps can be performed in a different order and certain steps may be performed in parallel. For example, step 904 may be performed before step 905, and steps 904 and 905 can be performed at any time, with respect to steps 901-903, but before step 906.

A computer system may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

IV. Access Request Scoring and Determining Access Outcomes

As discussed above, a configuration system can determine a score transformation table using access request data for recently processed access requests. The score transformation table is configured to determine an abbreviated score, which is associated with a target top percent risk value, based on a raw score output by the scoring model, the raw score being associated with a trending top percent risk values. The configuration system can provide the scoring model and the score transformation table to an access server for use in scoring real-time access requests. For example, the access server 130 of FIG. 1 can periodically receive scoring models 132 and score transformation tables 134 from the configuration system 170.

Figure 10:
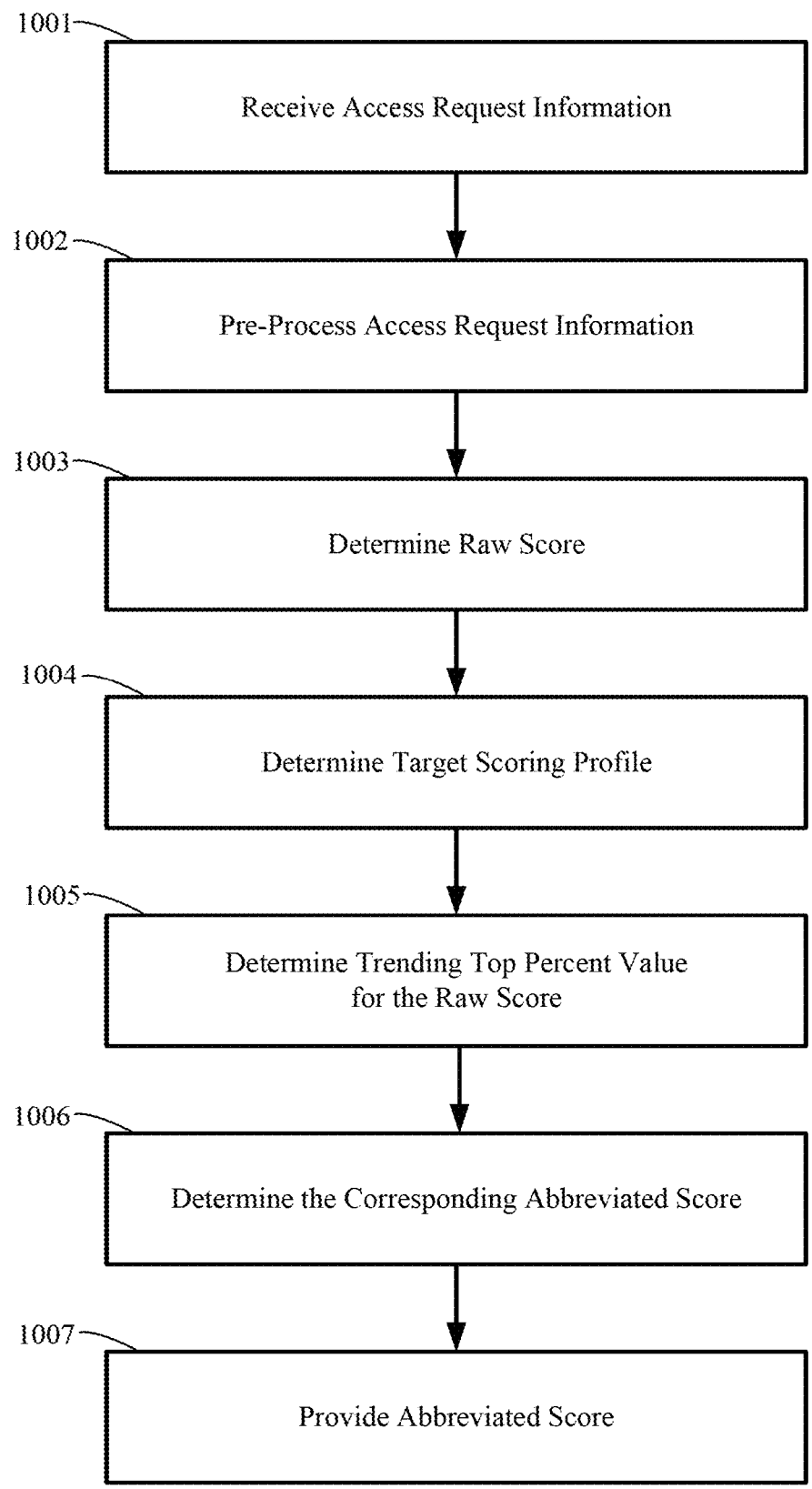
FIG. 10 shows a process for using a score transformation table to determine an abbreviated score for an access request, in accordance with some embodiments.
Figure 11:
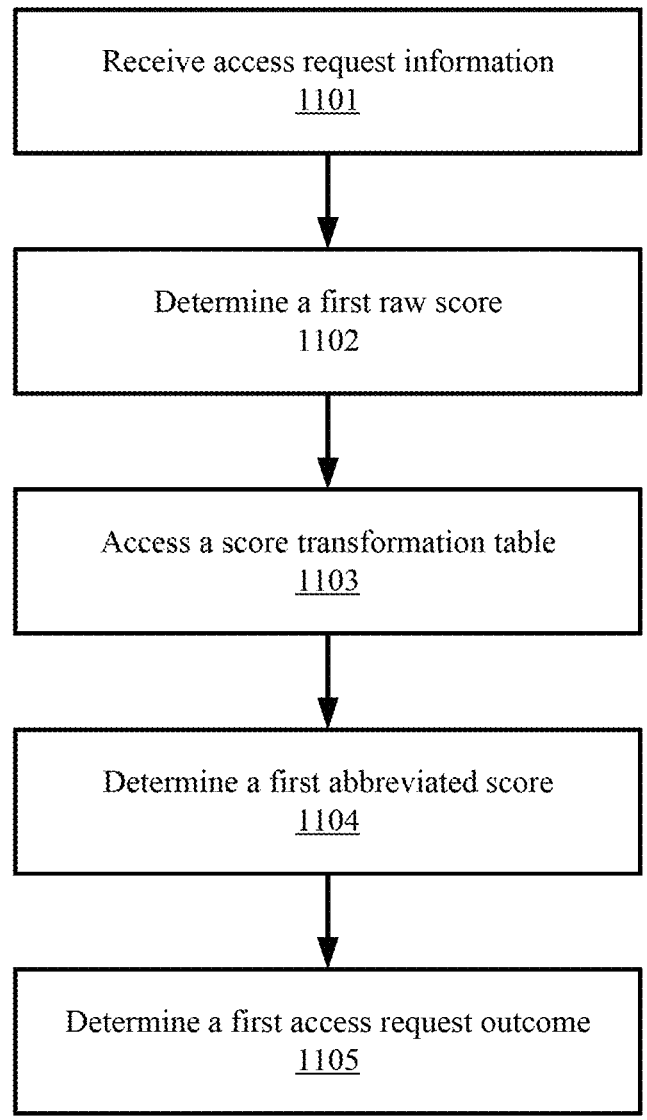
FIG. 11 shows a method for processing an access request, in accordance with some embodiments.

FIGS. 10 and 11 relate to access request scoring and determine access request outcomes. FIG. 10 shows a process for scoring access requests and FIG. 11 shows a process that determines an access request outcome based on the scoring of the access request. These processes can be performed by an access server (e.g., the access server 130 of FIG. 1). In some embodiments, these processes can be performed by a server that operates as both an access server and a configuration system (e.g., the configuration system 171 of FIG. 1).

FIG. 10 shows a process for using a score transformation table to determine an abbreviated score for an access request, in accordance with some embodiments. This process can be performed by an access server (e.g., the access server 130 of FIG. 1).

At step 1001 of the process, the access server can receive a request message include access request information. The access request information can correspond to a first access request sent to a computing device, such as a resource provider computer (e.g., the resource provider computer 110 of FIG. 1) or a request computer (e.g., the request computer 120 of FIG. 1). The request message can be received from that computing device over a network. The access request information in the request message can include an access request message (e.g., including an account name, a resource identifier, a request computer identifier, a requested resource amount, etc.). The request message can also include parameters of the access request (e.g., a date, a weekday, a time, a location in which the access request was made, etc.).

At 1002, the access server can generate detector results and determine associated penalties. The detector results and penalties are independent model input features in the scoring model for generating the raw score.

At 1003, the access server can determine a first raw score for the first access request using the scoring model. That is, the access request information and/or the parameters of the first access request can be input to the scoring model, which can determine and output the first raw score. The scoring model can determine the first raw score, from a set of potential output values, based on the features the access request information and/or the parameters of the first access request. For example, the scoring model may have potential output values of 0 to 100,000 and the first raw score may be 45,743.

At step 1004, the access server can determine a target scoring profile and associated score transformation table to use for the first access request. Different resource providers and resource requestors may be associated with different target scoring profiles and different score transformation tables. The access server can determine the particular score transformation table to use based on a scoring profile identifier provided with the first access requests.

At step 1005, the access server can determine the trending top percent value for the first raw score using the score transformation table. The access server can look up the first raw score (e.g., the potential output value) in the trending top percent risk table and determine which trending top percent risk value is associated with the first raw score. For example, the trending top percent risk table can associate the potential output value of 45,743 with a trending top percent risk value of 6.0024%. Trending top percent risk tables can be periodically provided to the access server by the configuration system. When a new or updated trending top percent risk table is received, the access server can use it to update the score transformation table.

In some embodiments, the trending top percent risk table can be configured to determine top percent risk values based on the weekday that the access request was received. In this example, the first access request, which is being scored, can be received on a Monday. The access request parameters provided along with the access request information for the first access request can include an identifier of the weekday. In such embodiments, the access server can determine which trending top percent risk value is associated with both the first raw score and the day of week. In this example, the raw score of 45,743 may be associated with the trending top percent risk value of 6.0024% on Mondays. The trending top percent risk table may have different trending top percent risk values associated with different days of the week for raw scores of 45,743 (e.g., due to the variation of raw scores between different days of the week, as discussed above). In some embodiments, the access server can store scoring profile tables and periodically receive updated trending top percent risk tables from the configuration system. In some embodiments, the corresponding abbreviated score can be determined by the access server periodically, or in real time.

At step 1006, the access server can determine a corresponding abbreviated score for the first raw score in the score transformation table. The access server can determine the corresponding abbreviated score based on which potential output value has a trending top percent risk value within a threshold (or, which is closest) to the target top risk value for the corresponding abbreviated score. These steps may be performed because the score transformation table may not include entries for each potential output value of the set of potential output values.

In some embodiments, the corresponding abbreviated score can be determined based on the first raw score being greater than a second raw score associated with the corresponding abbreviated score and less than a third raw score associated with the next abbreviated score after the corresponding abbreviated score (e.g., the next abbreviated score is 1 greater than the corresponding abbreviated score).

For example, the scoring model may assign (e.g., determine) a raw score of 45,921 for a particular access request. However, the score transformation table may not include an entry for the potential output value of 45,921. In this situation, the access server can determine which potential output value in the score transformation table is closest to 45,921. In this example, the score transformation table may include potential output values of 45,743 (corresponding to abbreviated score 50) and 46,443 (corresponding to abbreviated score 51). Accordingly, the access server can determine that the raw score of 45,921 is closer to the potential output value of 45,743, compared to the potential output value of 46,443 (e.g., based on the mathematical difference). In this situation, the access server can use the potential output value of 45,743 to determine the abbreviated score (e.g., 50), since it is the closest to the raw score. In another embodiment, the access server can determine that the raw score of 45,921 corresponds to the abbreviated score of 50 based on the raw score of 45,921 being greater than or equal to 45,743 (corresponding to abbreviated score 50) and less than 46,443 (corresponding to abbreviated score 51).

At step 1007, the access server can provide the abbreviated score to the resource provider computer or the request computer. The abbreviated score can be sent to the same computer that provided the access request information to the access server. The abbreviated score can be used to determine whether the first access request should be accepted, reviewed, or rejected. In some embodiments, the access request outcome can be based on a scoring threshold. For example, a resource request computer can set thresholds such that abbreviated scores of 50 or greater should are rejected, an abbreviated scores greater than or equal to 45 but less than 50 are reviewed, and abbreviated scores less than 45 are accepted.

Thus, the process of FIG. 10 can be used to determine a score for an access requests. Such scores can be used in determining an access request outcome for the access request (e.g., accept or reject it). Access to the resource can be granted or denied based on the access request outcome.

FIG. 11 shows a method for processing an access request, in accordance with some embodiments. The method can be performed by an access server (e.g., the access server 130 of FIG. 1).

At step 1101, the access server can receive access request information. The access request information can be included in a request message received from a computing device over a network. The access request information can correspond to a first access request, which can be a request to access a particular resource.

At step 1102, the access server can determine a first raw score for the first access request using a scoring model. The scoring model can determine the first raw score based on features of the first access request information. The scoring model can output scores within a set of potential output values (e.g., 0 to 100,000, or −50,000 to 50,000, etc.). The first raw score can be within a set of potential output values of the scoring model. A score output by the scoring model can be called a raw score.

At step 1103, the access server can access a score transformation table. That is, the access server can access the memory to obtain the score transformation table. The memory can be a system memory of the access server (e.g., a memory circuit coupled to one or more processor circuits). The score transformation table can be used to determine abbreviated score (e.g., 0 to 99) from raw scores (e.g., 0 to 100,000). The score transformation table can associate each abbreviated score in a set of abbreviated scores (e.g., 0 to 99) with a corresponding potential output value of the set of potential output values (e.g., 0 to 100,000). The score transformation table can be determined based on target top percent risk values for the abbreviated scores (e.g., the riskiness of an access request having the abbreviated score compared to the population of scored access requests). The score transformation table can also be determined based on a distribution of raw scores for a plurality of previous access requests across the set of potential output values (e.g., the percentage of the population of historical access requests scored at particular raw scores).

In some embodiments, the score transformation table can further associate each potential output value in the score transformation table with a trending top percent value. The trending top percent value for a particular potential output value can be determined based on a percentage of raw scores for the plurality of previous access requests that are equal to or greater than the potential output value. That is, the top percent risk value can indicate the percentage of the population of previous access requests that were scored at or above the particular potential output value.

In some embodiments, the abbreviated scores in the score transformation table can have integer values and interpolation can be used to determine a floating point number (e.g., having one or more decimal places) between the integer values. The floating point number for the abbreviated scores can improve precision. The access server can determine the floating point number based on a first trending top percent value for a first potential output value and a second trending top percent value for a second potential output value, where the first raw score for the first access request is greater than or equal to the first potential output value and less than the second potential output value. The floating point value can be determined based on the trending top percent value for the raw score and the difference between the first trending top percent value and the first trending top percent value. For example, the floating point number can be determined using equation (2) below, where F is the floating point value, T is the trending top percent risk associated with the raw score for the access request, L is the first trending top percent value, and R is the second trending top percent value:

$$F = \frac{L-T}{\frac{(L-R)}{100}} \quad (2)$$

At step 1104, the access server can determine a first abbreviated score using the score transformation table. The first abbreviated score for the first access request can be determined using the raw score for that access request. In some embodiments, a first potential output value in the score transformation table can be determined based on the first raw score being within a threshold of the first potential output value. Accordingly, the first abbreviated score can be determined on the first potential output value. These steps may be performed if a particular raw score is not included in the score transformation table.

In some embodiments, the score transformation table can further associate abbreviated scores with potential output values for each weekday. For example, the score transformation table can associate a first potential output value with a first abbreviated score on Mondays and associate a second potential output value with the first abbreviated score on Saturdays. To adapt to different week days, the first access request information in the request message can include a weekday identifier indicating the weekday on which the first access request was made. Then, the access server can determine the weekday on which the first access request was made based on the weekday identifier included in the first access request information. Accordingly, the first abbreviated score can be determined based on the weekday.

In some embodiments, different scoring profiles can be established for applying different score transformation tables. In such embodiments, the request message can include a scoring profile identifier. The access server can determine the score transformation table to be used from among a plurality of score transformation tables based on the scoring profile identifier. The different score transformation tables can each be associated with one or more scoring profile identifiers.

In some embodiments, several different scoring models can be used. For example, different scoring models can be used depending on the type of access request being assessed. In such embodiments, the request message can include a scoring model identifier. Accordingly, the access server can determine the scoring model to use, from among the plurality of scoring models, using the scoring model identifier that is included in the request message.

The access server can also store a set of access rules in the memory. The access rules can be used to determine an access request outcome for a particular access request. The access request outcome can be accept, review, or reject, for example. The access request outcome may be based on the abbreviated score. The access server can access the memory to obtain the set of access rules.

In some embodiments, the access server can periodically receive updates to a trending top percent risk table, which can be used to update the score transformation table. The trending top percent risk table can be received from a configuration system. The trending top percent table including a trending top percent value for each potential output value of the scoring model. After receiving the trending top percent risk table, the access server can update the score transformation table. To update the score transformation table, the access server can determine a corresponding potential output value for the abbreviated score based on the trending top percent value for the corresponding potential output value being within a threshold of the target top percent value for the abbreviated score. Thus, the score transformation table can dynamically adapt to changes in the distribution of raw scores over time.

The configuration system can determine an update schedule for updating the trending top percent risk table and sending the updated trending top percent risk table to the access server. The configuration system can provide an update scheduling user interface element that enable a user of the configuration system to set the update schedule (e.g., a certain amount of time or days between updates). The configuration system can receive input from the user indicating the update schedule via the update scheduling user interface element and update the trending top percent risk table, and send it to the access server, according to the received input.

At step 1105, the access server can determine a first access request outcome for the first access request using the access rules and the first abbreviated score. Then, the access server can provide a response message including the first access request outcome for the first access request. Access to the resource can be provided based on the first access request outcome.

The access server can also perform steps 1101-1105 for a second access request (e.g., receive second access request information corresponding to a second access request, determine a second raw score for the second access request, access the score transformation table, determine a second abbreviated score, and determine a second access request outcome for the second access request). The access server can further perform these steps for a plurality of access requests received in real time over a network.

As described, embodiments of the invention may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a," "an," or "the" is intended to mean "at least one," unless specifically indicated to the contrary. The use of "first," "second," "third," "fourth," etc., is intended to identify and differentiate between elements and does not necessarily imply an ordering of the elements unless stated.

What is claimed is:

1. A method for processing access requests, the method comprising performing, by an access server:
   receiving, from a computing device over a network, a request message including first access request information corresponding to a first access request, the first access request requesting access to a resource;
   determining a first raw score for the first access request using a scoring model, the scoring model determining the first raw score based on features of the first access request information, the first raw score being within a set of potential output values of the scoring model;
   determining, based on the first access request information, a first trending top percent risk table and a first target score profile table to use for the first access request, the first trending top percent risk table being determined based on a distribution of raw scores for a plurality of previous access requests across the set of potential output values;
   determining, using the first trending top percent risk table, a first trending top percent value for the first raw score;
   determining, using the first target score profile table, a first abbreviated score for the first trending top percent value;
   generating a response message using the first abbreviated score; and
   providing the response message over the network, thereby providing access to the resource based on the first abbreviated score.

2. The method of claim 1, wherein the response message is provided to a resource provider computer that controls the access to the resource.

3. The method of claim 1, wherein determining the first abbreviated score for the first trending top percent value comprises:
   determining a corresponding abbreviated score having a target top risk value that is within a threshold of the first trending top percent value.

4. The method of claim 1, wherein determining the first abbreviated score for the first trending top percent value comprises:
   determining a corresponding abbreviated score based on the first raw score being greater than a second raw score associated with the corresponding abbreviated score and less than a third raw score associated with a next abbreviated score after the corresponding abbreviated score.

5. The method of claim 1, wherein generating the response message includes:
   determining an access request outcome based on the first abbreviated score.

6. The method of claim 1, wherein the first access request is sent to a resource provider computer or a request computer.

7. The method of claim 1, further comprising:
   storing a plurality of trending top percent risk tables and a plurality of target score profile tables, wherein the request message includes an identifier, and wherein determining the first trending top percent risk table and the first target score profile table includes:
   selecting, based on the identifier, the first trending top percent risk table from the plurality of trending top percent risk tables and the first target score profile table from the plurality of target score profile tables.

8. The method of claim 7, further comprising:
   periodically updating the first trending top percent risk table based on a new distribution of raw scores for a new set of previous access requests.

9. The method of claim 1, wherein the first access request information includes a time parameter for when the first access request was made, and wherein the first trending top percent risk table is determined based on the time parameter.

10. The method of claim 1, wherein the first trending top percent risk table associates each potential output value of the set of potential output values with a trending top percent value, the trending top percent value for a particular potential output value being based on a percentage of raw scores for the plurality of previous access requests that are equal to or greater than the potential output value.

11. An access server, comprising:
a processor; and
a non-transitory computer-readable storage medium coupled to the processor and storing code executable by the processor for performing operations comprising:
receiving, from a computing device over a network, a request message including first access request information corresponding to a first access request, the first access request requesting access to a resource;
determining a first raw score for the first access request using a scoring model, the scoring model determining the first raw score based on features of the first access request information, the first raw score being within a set of potential output values of the scoring model;
determining, based on the first access request information, a first trending top percent risk table and a first target score profile table to use for the first access request, the first trending top percent risk table being determined based on a distribution of raw scores for a plurality of previous access requests across the set of potential output values;
determining, using the first trending top percent risk table, a first trending top percent value for the first raw score;
determining, using the first target score profile table, a first abbreviated score for the first trending top percent value;
generating a response message using the first abbreviated score; and
providing the response message over the network, thereby providing access to the resource based on the first abbreviated score.

12. The access server of claim 11, wherein the response message is provided to a resource provider computer that controls the access to the resource.

13. The access server of claim 11, wherein determining the first abbreviated score for the first trending top percent value comprises:
determining a corresponding abbreviated score having a target top risk value that is within a threshold of the first trending top percent value.

14. The access server of claim 11, wherein determining the first abbreviated score for the first trending top percent value comprises:
determining a corresponding abbreviated score based on the first raw score being greater than a second raw score associated with the corresponding abbreviated score and less than a third raw score associated with a next abbreviated score after the corresponding abbreviated score.

15. The access server of claim 11, wherein generating the response message includes:
determining an access request outcome based on the first abbreviated score.

16. The access server of claim 11, wherein the first access request is sent to a resource provider computer or a request computer.

17. The access server of claim 11, wherein the operations further comprise:
storing a plurality of trending top percent risk tables and a plurality of target score profile tables, wherein the request message includes an identifier, and wherein determining the first trending top percent risk table and the first target score profile table includes:
selecting, based on the identifier, the first trending top percent risk table from the plurality of trending top percent risk tables and the first target score profile table from the plurality of target score profile tables.

18. The access server of claim 17, wherein the operations further comprise:
periodically updating the first trending top percent risk table based on a new distribution of raw scores for a new set of previous access requests.

19. The access server of claim 11, wherein the first access request information includes a time parameter for when the first access request was made, and wherein the first trending top percent risk table is determined based on the time parameter.

20. The access server of claim 11, wherein the first trending top percent risk table associates each potential output value of the set of potential output values with a trending top percent value, the trending top percent value for a particular potential output value being based on a percentage of raw scores for the plurality of previous access requests that are equal to or greater than the potential output value.

\* \* \* \* \*